United States Patent
Heiberg et al.

(10) Patent No.: US 10,867,520 B2
(45) Date of Patent: Dec. 15, 2020

(54) SYSTEM AND METHOD TO MODIFY AN AIRCRAFT FLIGHT TRAJECTORY

(71) Applicant: THE BOEING COMPANY, Chicago, IL (US)

(72) Inventors: Christopher J. Heiberg, Sunset Beach, CA (US); Thomas E. Yochum, Bothell, WA (US)

(73) Assignee: THE BOEING COMPANY, Chicago, IL (US)

( * ) Notice: Subject to any disclaimer, the term of this patent is extended or adjusted under 35 U.S.C. 154(b) by 177 days.

(21) Appl. No.: 16/103,454

(22) Filed: Aug. 14, 2018

(65) Prior Publication Data
US 2020/0058225 A1     Feb. 20, 2020

(51) Int. Cl.
*G08G 5/00*     (2006.01)
*B64C 13/18*     (2006.01)
*B64C 13/16*     (2006.01)

(52) U.S. Cl.
CPC .......... *G08G 5/0039* (2013.01); *B64C 13/18* (2013.01); *G08G 5/0034* (2013.01); *B64C 13/16* (2013.01); *G08G 5/003* (2013.01)

(58) Field of Classification Search
CPC ...... G05D 1/0202; G05D 1/0204; G05D 1/00; G05D 3/00; B64C 13/18; B64C 39/024;
(Continued)

(56) References Cited

U.S. PATENT DOCUMENTS 6,606,034 B1 *   8/2003   Muller ................ G08G 5/0086
                                                        340/970
7,333,030 B2 *   2/2008   Baranov ................ G05D 1/104
                                                        340/963
(Continued)

FOREIGN PATENT DOCUMENTS

EP            3089115 A1     11/2016

OTHER PUBLICATIONS

Improving Climb Performance Prediction in Air Traffic Control with Machine Learning and Full Flight Simulator Verification Matthias Poppe ; Thomas Pütz ; Roland Scharff; 2019 IEEE/AIAA 38th Digital Avionics Systems Conference (DASC); IEEE Conf. (Year: 2019).*

(Continued)

*Primary Examiner* — Cuong H Nguyen
(74) *Attorney, Agent, or Firm* — Moore IP Law

(57) ABSTRACT

A method includes generating a flight plan of an aircraft. The flight plan is based on at least one waypoint and a set of operational rules associated with the aircraft. The method also includes generating an initial trajectory profile based on the at least one waypoint and the set of operational rules. The method further includes identifying an impermissible flight condition associated with the initial trajectory profile. The impermissible flight condition violates at least one operational rule of the set of operational rules. The method further includes generating a modified trajectory profile by modifying at least one aspect of the initial trajectory profile to remove the impermissible flight condition. The modified trajectory profile can be used by a pilot to fly the aircraft, the modified trajectory profile can be used by an autopilot system, or the modified trajectory profile can be displayed.

32 Claims, 37 Drawing Sheets

(58) Field of Classification Search
CPC .... B64C 13/16; G08G 5/0039; G08G 5/0034; G08G 5/025; G07C 5/0808; G07C 5/085; G07C 5/008; G07C 5/0841; B64D 45/0059; B64D 45/00; B64D 2045/0065; B64D 2045/0085
USPC ....... 701/3, 14, 10, 122, 411; 244/175, 75.1, 244/76 R
See application file for complete search history.

(56) References Cited

U.S. PATENT DOCUMENTS

| | | | | |
|---|---|---|---|---|
| 7,568,662 | B1* | 8/2009 | Conner | B64D 45/0031 244/175 |
| 7,702,428 | B2* | 4/2010 | Markiton | G08G 5/0086 701/5 |
| 8,000,848 | B2* | 8/2011 | Baranov | G05D 1/0204 701/14 |
| 8,527,118 | B2* | 9/2013 | Jones | G01C 23/00 701/11 |
| 8,538,673 | B2* | 9/2013 | Sislak | G08G 5/0008 701/301 |
| 8,718,839 | B2* | 5/2014 | Everett | G05D 1/0061 701/3 |
| 2002/0133294 | A1 | 9/2002 | Farmakis et al. | |
| 2006/0167598 | A1* | 7/2006 | Pennarola | G08G 5/0013 701/11 |
| 2007/0103340 | A1* | 5/2007 | Baranov | G08G 5/00 340/968 |
| 2008/0021635 | A1* | 1/2008 | Lohmiller | G05D 1/0202 701/533 |
| 2010/0114633 | A1* | 5/2010 | Sislak | G08G 5/006 701/120 |
| 2011/0022291 | A1* | 1/2011 | He | G08G 5/025 701/120 |
| 2012/0150367 | A1* | 6/2012 | Potagnik | G05D 1/0055 701/3 |
| 2014/0257602 | A1* | 9/2014 | Gaston | G08G 5/025 701/16 |
| 2016/0019795 | A1 | 1/2016 | Chircop et al. | |
| 2016/0318622 | A1* | 11/2016 | Haukom | G07C 5/0808 |

OTHER PUBLICATIONS

Predictor-corrector reentry guidance based on online model identification; Cheng Yang ; Cheng Lin ; Zhang Qingzhen ; Pei Chu; 2017 36th Chinese Control Conference (CCC), IEEE Conf. (Year: 2017).*
Flight conditions for rotating cylindrical wing; Raphaël Casimir; 2016 IEEE International Conference on Control and Robotics Engineering (ICCRE); IEEE Conf. (Year: 2016).*
Extended European Search Report for Application No. 19191085.0 dated Dec. 19, 2019, 7 pgs.

* cited by examiner

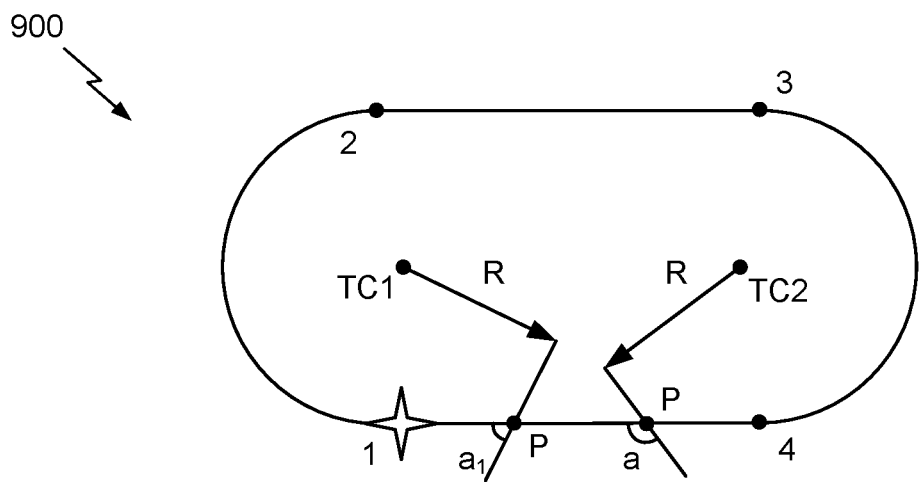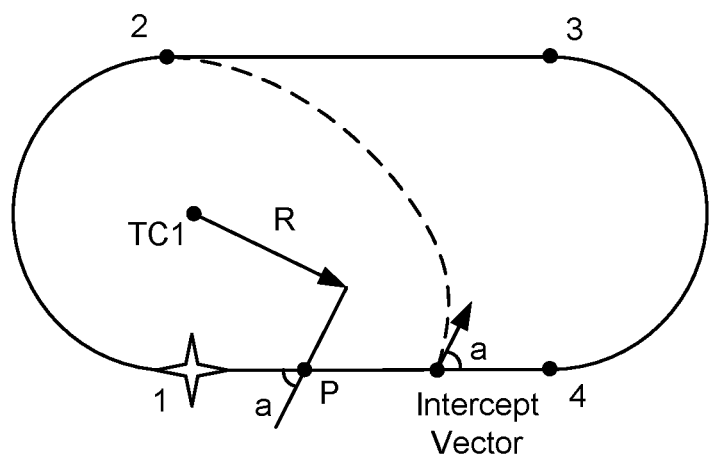
FIG. 9

SYSTEM AND METHOD TO MODIFY AN AIRCRAFT FLIGHT TRAJECTORY

FIELD OF THE DISCLOSURE

The present disclosure is related to modifying a trajectory profile for an aircraft.

BACKGROUND

An aircraft can include a flight management system that generates a trajectory profile for the aircraft based on a flight plan. The flight plan includes multiple waypoints (e.g., intermediate points) between a starting point of a flight (e.g., a take-off position) and a destination point (e.g., a landing position) of the flight. The trajectory profile is intended to produce a continuous and flyable flight path for the aircraft while complying with industry guidelines (e.g., Federal Aviation Administration (FAA) guidelines). Typically, the trajectory profile is generated using algorithms designed to achieve the flight plan. The algorithms convert a flight plan into a trajectory profile which is a flyable, optimized, four-dimensional path (latitude, longitude, altitude and time) through space that the aircraft is predicted to fly. For example, the algorithm is designed to produce the continuous and flyable path for the aircraft from the starting point to the destination point via the waypoints in the flight plan. The flight management system displays the trajectory profile on a screen within a cockpit of the aircraft, and a pilot of the aircraft can maneuver (or use an autopilot to control) the aircraft to fly the trajectory profile to reach the destination point. In an ideal scenario, flight conditions are permissible to enable the pilot to smoothly maneuver the aircraft past each waypoint along the path.

However, in some scenarios, flight conditions can change during the flight and the pilot (or autopilot) is not able to smoothly maneuver the aircraft through each waypoint. As a non-limiting example, the speed of the aircraft can prevent the pilot from maneuvering (or make it difficult for the pilot to maneuver) the aircraft along a particular trajectory through a particular waypoint. As a result, the trajectory of the aircraft can deviate from the trajectory profile.

SUMMARY

According to one implementation of the present disclosure, a method includes generating, at a processor, a flight plan of an aircraft. The flight plan is based on at least one waypoint and a set of operational rules associated with the aircraft. The method also includes generating an initial trajectory profile based on the at least one waypoint and the set of operational rules. The method further includes identifying an impermissible flight condition associated with the initial trajectory profile. The impermissible flight condition violates at least one operational rule of the set of operational rules. The method further includes generating a modified trajectory profile by modifying at least one aspect of the initial trajectory profile to remove the impermissible flight condition. The method also includes generating data representing the modified trajectory profile in at least one form that accommodates other flight management systems of the aircraft or other pilots to fly the aircraft along the modified trajectory profile.

According to another implementation of the present disclosure, an aircraft includes a memory storing a set of operational rules associated with the aircraft. The aircraft also includes a flight management system coupled to the memory. The flight management system is configured to generate a flight plan of an aircraft based on at least one waypoint and the set of operational rules. The flight management system is also configured to generate an initial trajectory profile based on the at least one waypoint and the set of operational rules. The flight management system is further configured to identify an impermissible flight condition associated with the initial trajectory profile. The impermissible flight condition violates at least one operational rule of the set of operational rules. The flight management system is also configured to generate a modified trajectory profile by modifying at least one aspect of the initial trajectory profile to remove the impermissible flight condition. The flight management system is also configured to generate data representing the modified trajectory profile in at least one form that accommodates other flight management systems of the aircraft or other pilots to fly the aircraft along the modified trajectory profile.

According to another implementation of the present disclosure, a non-transitory computer-readable medium stores instructions that, when executed by a processor, cause the processor to perform operations including generating a flight plan of an aircraft. The flight plan is based on at least one waypoint and a set of operational rules associated with the aircraft. The initial trajectory profile also includes generating an initial trajectory profile based on the at least one waypoint and the set of operational rules. The operations further include identifying an impermissible flight condition associated with the initial trajectory profile. The impermissible flight condition violates at least one operational rule of the set of operational rules. The operations also include generating a modified trajectory profile by modifying at least one aspect of the initial trajectory profile to remove the impermissible flight condition. The operations also include generating data representing the modified trajectory profile in at least one form that accommodates other flight management systems of the aircraft or other pilots to fly the aircraft along the modified trajectory profile.

One advantage of the above-described implementation is dynamic modification to an initial trajectory profile in response to impermissible flight conditions. As a non-limiting example, the initial flight plan can indicate that an aircraft is to have a turn radius of 10 kilometers to pass by a waypoint in the initial flight plan. However, due to impermissible flight conditions (e.g., unexpected tail wind), completion of the turn at the turn radius would violate the airplane's operational capability (e.g., the bank angle would be too steep) so the aircraft would be unable to stay on the trajectory profile. Thus, to ensure the airplane has a flyable trajectory profile, a flight management system can modify the initial trajectory profile during the flight to modify a turn transition (e.g., move the turn initiation point upwind on the trajectory profile 0.5 kilometers) so that the airplane can initiate the turn sooner and, therefore, comply with the rules for the given flight plan.

Additionally, one or more of the features, functions, and advantages that have been described can be achieved independently in various implementations or can be combined in yet other implementations, further details of which are disclosed with reference to the following description and drawings.

BRIEF DESCRIPTION OF THE DRAWINGS

FIG. 9 depicts diagrams that are indicative of a process to determine whether an impermissible flight condition is present using a particular hold entry sector;

DETAILED DESCRIPTION

Particular embodiments of the present disclosure are described below with reference to the drawings. In the description, common features are designated by common reference numbers throughout the drawings.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

The techniques described herein enable a flight management system of an aircraft to dynamically modify a trajectory profile, before or during flight, in response to detecting an impermissible flight condition. For example, an initial flight plan includes an initial flight trajectory that, when followed, guides the aircraft through one or more waypoints of the initial flight plan. If an impermissible flight condition is present, maneuvering the aircraft along the initial flight trajectory can cause the autopilot to disengage. As a non-limiting example, the speed of the aircraft could result in a turn radius that forces the aircraft to maneuver outside of the airspace required by the flight plan. Thus, in response to identifying the impermissible flight condition (e.g., the turn radius resulting in the aircraft exiting the allowed airspace), the flight management system modifies the initial trajectory profile to generate a modified flight trajectory profile. In the modified trajectory profile, the initial trajectory is modified such that the turn initiation points are relocated in a manner to produce a smooth, flyable profile that is within the allowable airplane limitations and follows closely the intent of the original trajectory profile, as a non-limiting example. As another non-limiting example, the turn centers in the initial trajectory profile are moved in the modified trajectory profile to accommodate for an increased turn radius. Other examples of impermissible flight conditions and other examples of modifying a flight trajectory profile are described below.

Figure 1:
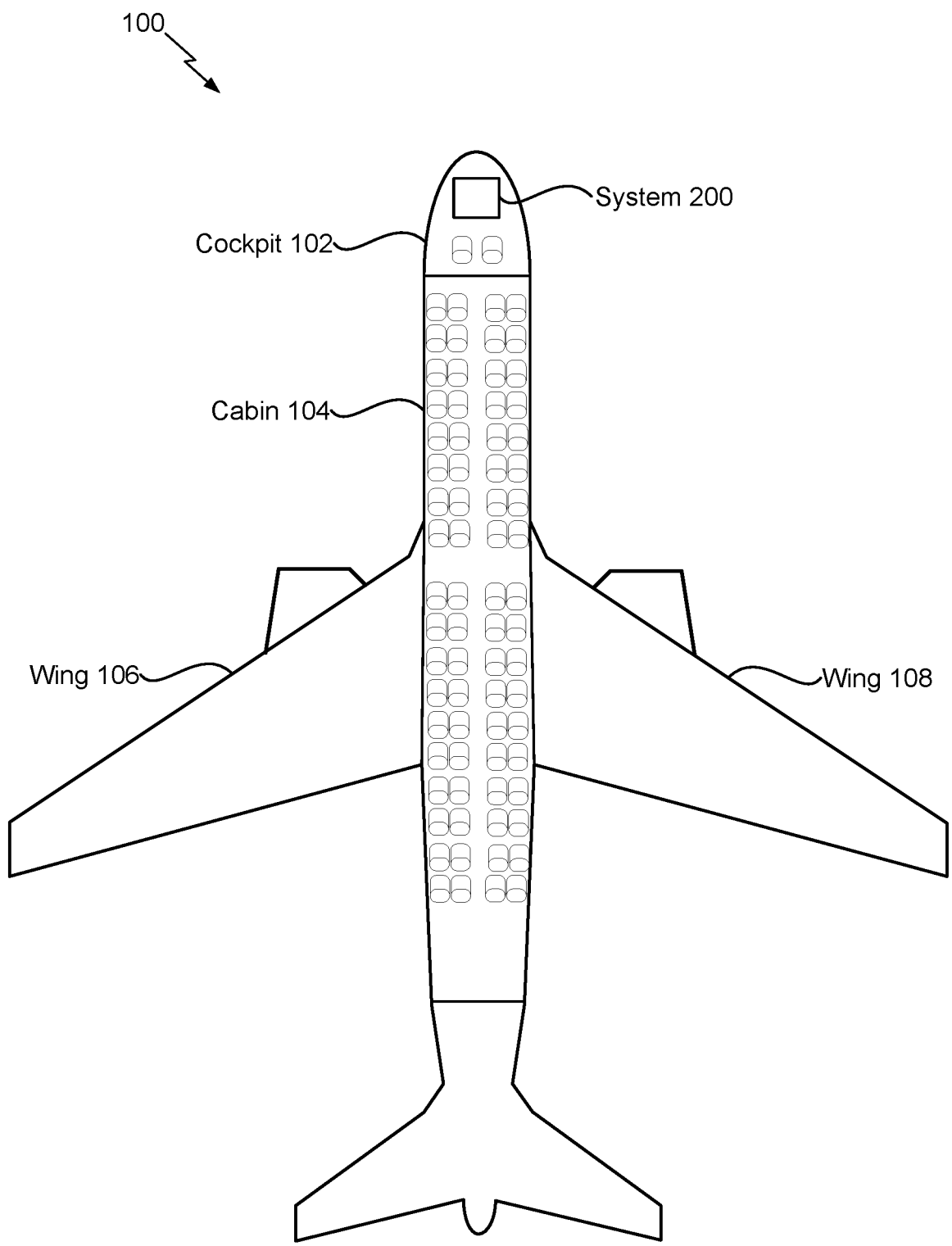
FIG. 1 is a diagram of an aircraft that includes a system operable to dynamically modify an initial trajectory profile during flight in response to identifying an impermissible flight condition.

FIG. 1 is a diagram of an aircraft 100. The aircraft 100 includes a cockpit 102, a cabin 104, a wing 106, and a wing 108. The cockpit 102 includes a system 200 that is operable to dynamically modify an initial trajectory profile of the aircraft 100 during flight in response to identifying an impermissible flight condition. For example, while the aircraft 100 is travelling between a starting point and a destination point, the system 200 can modify the initial trajectory profile (e.g. modify a turn center location) in response to a determination that flight conditions of the aircraft 100 make travelling along the initial trajectory profile "impermissible"

according to one or more operational rules associated with the aircraft 100. The system 200 is described in greater detail with respect to FIG. 2.

Figure 2:
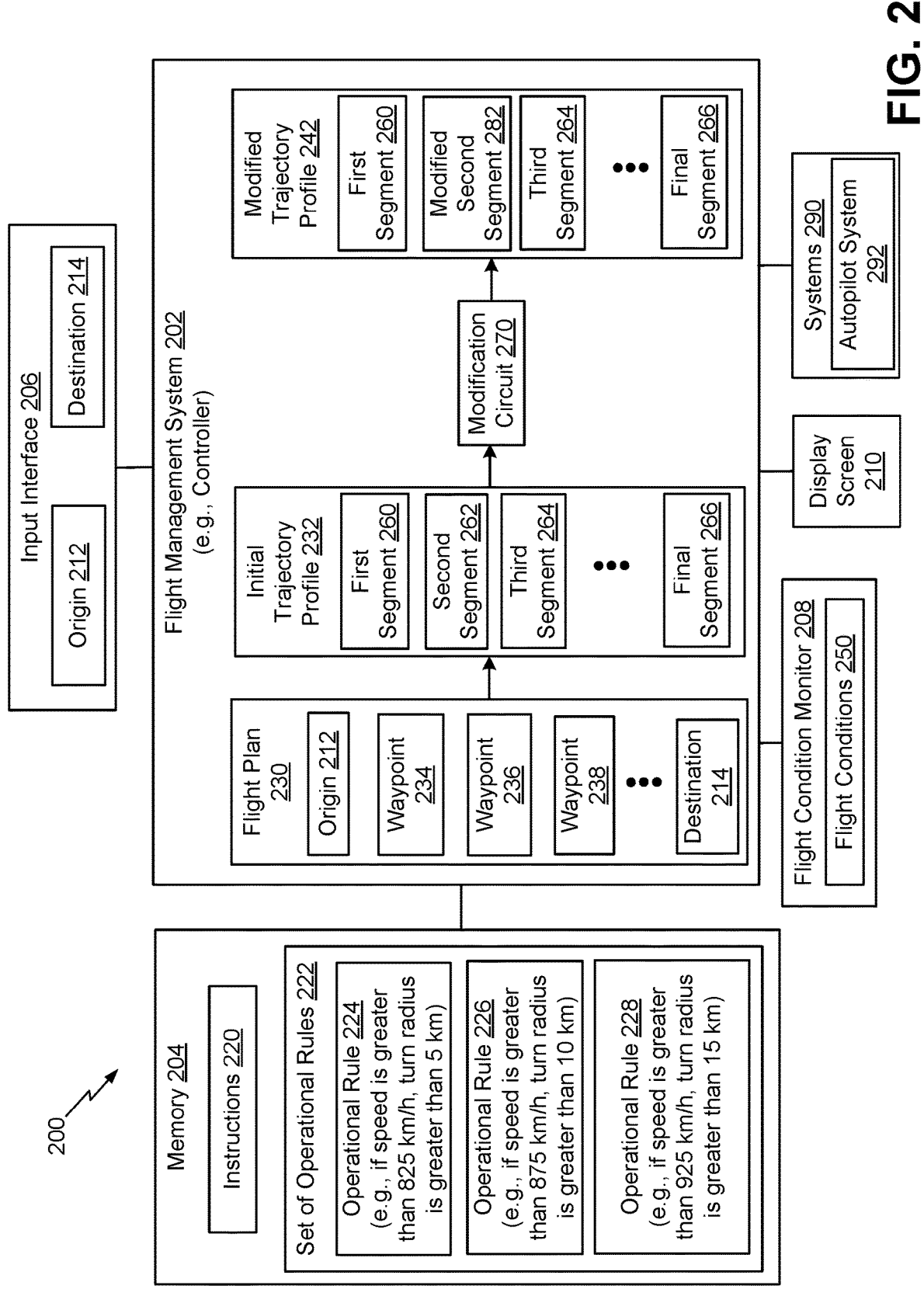
FIG. 2 is a block diagram of the system of FIG. 1.

Referring to FIG. 2, a particular diagram of the system 200 that is operable to dynamically modify an initial trajectory profile during flight is shown. The system 200 includes a flight management system 202 (e.g., a controller), a memory 204 coupled to the flight management system 202, an input interface 206 coupled to the flight management system 202, a flight condition monitor 208 coupled to the flight management system 202, a display screen 210 coupled to the flight management system 202, and one or more systems 290 coupled to the flight management system 202. The one or more systems 290 include an autopilot system 292. According to some implementations, one or more components of the system 200 are integrated into the flight management system 202. As a non-limiting example, the input interface 206 and the flight condition monitor 208 can be integrated into the flight management system 202.

The memory 204 is a non-transitory computer-readable medium that stores instructions 220 that are executable by the flight management system 202 to perform the operations described below. The memory 204 also stores a set of operational rules 222 associated with the aircraft 100. In FIG. 2, the set of operational rules 222 includes an operational rule 224, an operational rule 226, and an operational rule 228. Although three operational rules are illustrated, in other implementations, the set of operational rules 222 can include additional (or fewer) operational rules. As a non-limiting example, the set of operational rules 222 includes forty-five operational rules. As another non-limiting example, the set of operational rules 222 includes a single operational rule.

Each operational rule 224-228 of the set of operational rules 222 indicates a different rule for operating the aircraft 100. As a non-limiting example, the operational rule 224 indicates that a turn radius for the aircraft 100 is not to be less than 5 kilometers if the aircraft 100 is travelling at a speed greater than 825 kilometers per hour. As another non-limiting example, the operational rule 226 indicates that a turn radius for the aircraft 100 is not to be less than 10 kilometers if the aircraft 100 is travelling at a speed greater than 875 kilometers per hour. As another non-limiting example, the operational rule 228 indicates that a turn radius for the aircraft 100 is not to be less than 15 kilometers if the aircraft 100 is travelling at a speed greater than 925 kilometers per hour. It should be understood that the operational rules 224-228 are merely illustrative examples and should not be construed to as limiting. Additionally, in some implementations, one or more operational rules 224-228 of the set of operational rules 222 are included in or correspond to an industry guideline (e.g., a Federal Aviation Administration (FAA) guideline). In other implementations, the set of operational rules 222 includes rules specified by a manufacturer of the aircraft 100, rules specified by a government agency, user-entered rules, or a combination thereof.

The input interface 206 can be a keypad, a voice input device, a touch screen device, or any other device that is operable to receive an input. The input interface 206 is used to provide an origin 212 and a destination 214 to the flight management system 202. The origin 212 corresponds to a starting location of the flight, and the destination 214 corresponds to an ending location of the flight. To illustrate, a pilot or co-pilot can provide longitude and latitude coordinates of the origin 212 to the flight management system 202 via the input interface 206. According to some implementations, the longitude and the latitude coordinates of the origin 212 are automatically determined using a global positioning system (GPS). For example, the GPS determines the location of the aircraft 100 and set the location as the origin 212. The pilot or co-pilot can provide longitude and latitude coordinates of the destination 214 to the flight management system 202 via the input interface 206. As a non-limiting example, the pilot provides the longitude and the latitude coordinates of a destination airport to the flight management system 202. As another non-limiting example, the pilot provides the airport code of the destination airport to the flight management system 202, and the flight management system 202 determines the longitude and the latitude coordinates of the destination 214 based on the airport code.

Based on the origin 212 and the destination 214, the flight management system 202 is configured to generate a flight plan 230 that, when followed, enables the aircraft 100 to safely navigate from the origin 212 to the destination 214. However, in some scenarios, the flight plan 230 may include one or more discontinuities (e.g., based on two waypoints being too close). The flight plan 230 is displayed at the display screen 210. The flight plan 230 includes a plurality of waypoints 234-238 that the aircraft 100 is to pass through in route to the destination 214. For example, during flight, the flight plan 230 projects the aircraft 100 to pass through a waypoint 234, pass through a waypoint 236, pass through a waypoint 238, and finally arrive at the destination 214. In some implementations, "passing through" a waypoint includes flying within a particular distance of the waypoint. To ensure that the aircraft 100 is travelling along the projected route (e.g., through the waypoints 234-238), the flight management system 202 generates an initial trajectory profile 232 that, when followed, ensures that the aircraft 100 stays on course. For example, the initial trajectory profile 232 indicates when the aircraft 100 is to turn, a turn radius for each turn of the aircraft 100, an altitude for the aircraft 100 at different instances during the flight, etc.

In FIG. 2, the initial trajectory profile 232 includes a first segment 260, a second segment, 262, a third segment 264, and a final segment 266. Although four segments are illustrated, in other implementations, the initial trajectory profile 232 can include additional (or fewer) segments. Each segment 260-266 may include flight trajectory information (e.g., flight trajectory paths) that indicates initial turn points, turn centers, final turn points, turn radii, altitude, speed, etc.

The initial trajectory profile 232 is based on the set of operational rules 222. As a non-limiting example, the turn radius (or bank angle) for each turn in the initial trajectory profile 232 is constructed to satisfy each operational rule 224-228 in the set of operational rules 222. However, in some situations, flight conditions during the course of the flight can change in such a manner to cause the aircraft 100 to violate at least one of the operational rules 224-228 if the initial trajectory profile 232 is followed. As a non-limiting example, the flight crew may be asked by air traffic control to deviate from their flight plan (e.g., the flight plan 230) temporarily. Later, the flight crew may be asked to return to their filed flight plan (e.g., the flight plan 230), but because of the position, velocity, and track angle of the aircraft 100 at the time they are asked to return to the flight plan 230, the geometry of the initial trajectory profile 232 may not allow for the path to meet the intent of the flight plan 230. As another non-limiting example, the flight plan 230 may be populated with a Standard Instrument Departure (SID) with a series of waypoints that are closely-spaced, and the procedure designer may assume a certain level of aircraft performance to ensure the speed of the aircraft 100 is low enough to accomplish the desired trajectory. However, the aircraft 100 may have actual performance (e.g., acceleration) that exceeds the procedure designer's assumptions, and the resulting turn radii may not allow for a trajectory that meets the procedure's intent.

To determine whether at least one segment of the initial trajectory profile 232 violates at least one of the operational rules 224-228, the flight management system 202 compares flight conditions 250 of the aircraft 100 to segment information in the initial trajectory profile 232. The flight conditions 250 of the aircraft 100 can include the speed of the aircraft 100 at a particular instance, the expected maximum allowable bank angle, weather conditions, altitude, etc. The flight condition monitor 208 is configured to monitor the flight conditions 250 of the aircraft 100 and provide the flight conditions 250 to the flight management system 202. As non-limiting examples, the flight condition monitor 208 can include a sensor (such as GPS) configured to determine the ground speed of the aircraft 100, an air data computer configured to determine the airspeed of the aircraft 100, an altimeter configured to determine an altitude of the aircraft 100, other systems, or a combination thereof.

The flight management system 202 is configured to compare the flight conditions 250 of the aircraft 100 to the segment information in the initial trajectory profile 232 to determine whether at least one flight condition is an impermissible flight condition. As described herein, an "impermissible flight condition" is a flight condition that would result in the aircraft 100 violating at least one operational rule of the set of operational rules 222 if the aircraft 100 travels according to a trajectory profile. For example, if the flight conditions 250 indicate that the aircraft 100 would need to initiate a turn prior to the previous turn being completed, the flight management system 202 can indicate that the flight conditions 250 are impermissible. Examples of identifying impermissible flight conditions are described with respect to FIGS. 3-11.

Figure 5:
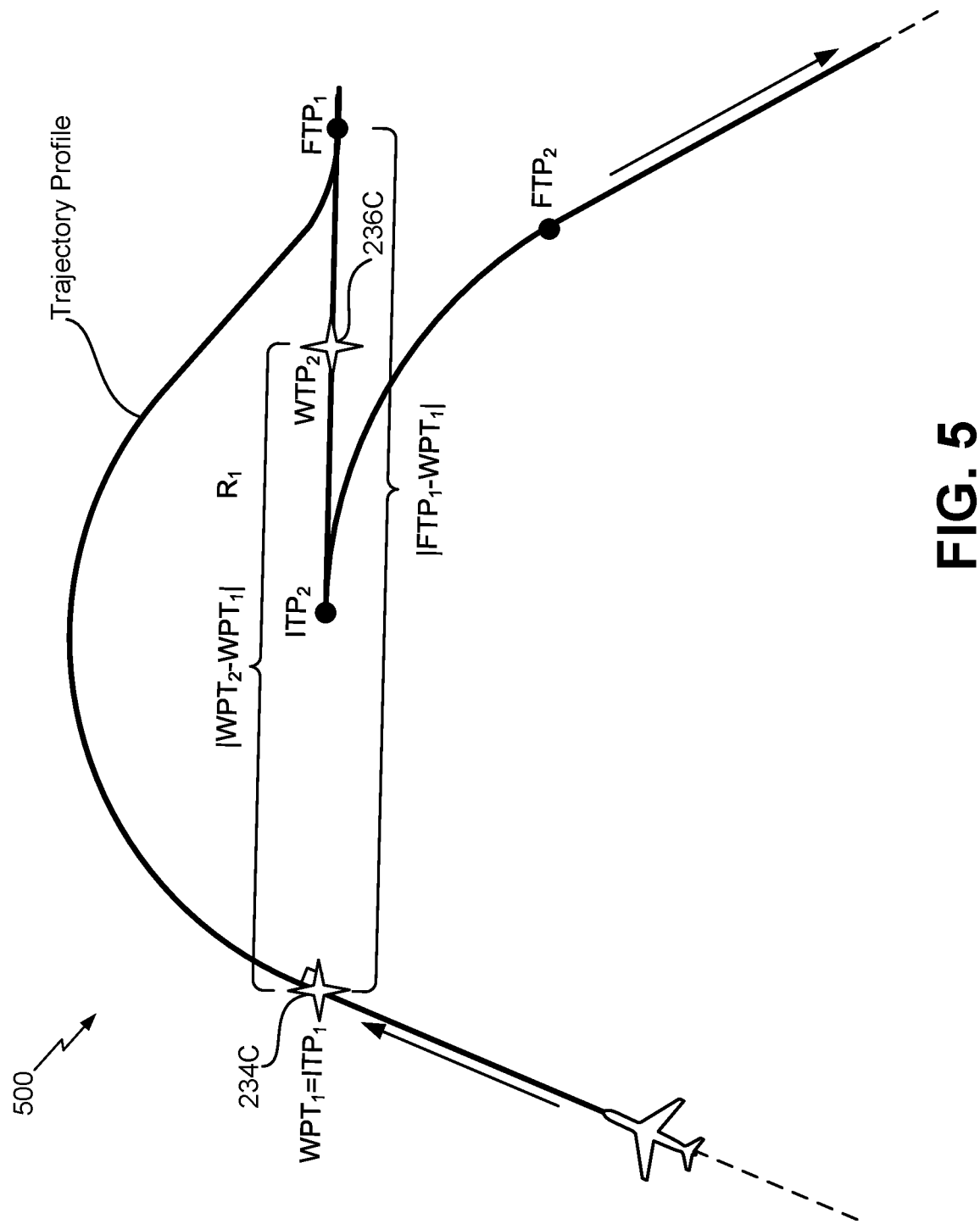
FIG. 5 is a diagram that is indicative of a process to determine whether an impermissible flight condition is present.

According to one implementation, as described with respect to FIG. 5, the impermissible flight condition is identified based on a first distance between a first waypoint (e.g., the waypoint 234) and a final point of a first turn included in the initial trajectory profile 232 and a second distance between a second waypoint (e.g., the waypoint 236) and the first waypoint. According to another implementation, as described with respect to FIG. 6, the impermissible flight condition is identified based on a first distance between the final point of the first turn and the first waypoint (e.g., the waypoint 234) and a second distance between an initial point of a second turn included in the initial trajectory profile 232 and the first waypoint.

According to another implementation, as described with respect to FIGS. 8-11, the impermissible flight condition is identified based on a comparison of a bank angle included in the initial trajectory profile 232 and a bank angle determined based on an groundspeed of the aircraft 100. For example, if the required bank angle in the initial trajectory profile 232 is not achievable due to the predicted state of the aircraft causing the bank angle to be limited, an impermissible fight condition is identified. The impermissible flight condition can also be based on detection of an incomplete turn within the initial trajectory profile 232. As used herein, an "incomplete turn" corresponds to a turn that that has not been fully completed by the aircraft 100.

In response to determining that the flight conditions 250 are impermissible according to the set of operational rules 222, a modification circuit 270 of the flight management system 202 generates a modified trajectory profile 242 by modifying at least one aspect of the initial trajectory profile 232 to remove the impermissible flight conditions. In FIG. 2, the second segment 262 of the initial trajectory profile 232 is modified to generate a modified second segment 282. For example, during the flight, the flight management system 202 can modify the initial trajectory profile 232 (e.g., modify the turn starting and end points of turns in the initial trajectory profile 232, insert straight segments between turns in the initial trajectory profile 232, relocate the position of turn centers, etc.) to generate the modified trajectory profile 242. Examples of modifying an initial trajectory profile are described with respect to FIGS. 12-31. The display screen 210 is configured to display the modified trajectory profile 242. The flight management system 202 also can update at least one of the one or more systems 290 with the modified trajectory profile 242. For example, the flight management system 202 can update the autopilot system 292 with the modified trajectory profile 242 to enable the aircraft 100 to fly along the modified trajectory profile 242 when the autopilot is engaged.

Modifying at least one aspect (e.g., the second segment 262) of the initial trajectory profile 232 can include modifying a location of a center of the first turn included in the initial trajectory profile 232, modifying a location of a center of a second turn included in the initial trajectory profile 232, or both. The second turn may be immediately subsequent to the first turn in the initial trajectory profile 232. The modification circuit 270 can determine the distance to move the turn centers of each turn described herein using a closed-form technique based on one or more algorithms or using an iterative technique. According to one implementation, the location of the center of the first turn is moved along an axis that intersects the center of the first turn and a center of the second turn included in the initial trajectory profile. According to another implementation, the location of the center of the first turn is moved along an axis that is parallel to an inbound course of the first turn, and the location of the center of the second turn is moved along an axis that is parallel to an outbound course of the second turn.

According to one implementation, modifying the second segment 262 of the initial trajectory profile 232 can also include inserting a straight segment between the first turn of the initial trajectory profile 232 and the second turn of the initial trajectory profile 232. The straight segment can also be rotated to modify the second segment 262 to generate the modified second segment 282. According to one implementation, modifying the second segment 262 of the initial trajectory profile 232 can include performing a course capture. Additionally, modifying the second segment 262 may include projecting a line segment from an outbound course by a course capture intercept angle.

According to one implementation, modifying the second segment 262 can also include constructing a flight trajectory between the waypoint 234 and the waypoint 238 of the flight plan 230. For example, the modification circuit 270 can bypass construction of a flight trajectory between the waypoint 234 and the waypoint 236 of the flight plan 230. In this scenario, the waypoint 236 is subsequent to the waypoint 234, and the waypoint 238 is subsequent to the waypoint 236. Thus, in essence, modifying the initial trajectory profile 232 can include modifying a trajectory to ignore a waypoint in the flight plan 230.

Modifying at least one aspect of the initial trajectory profile 232 can also include generating a virtual waypoint that replaces two or more waypoints in the flight plan 230. For example, a virtual waypoint 246 may replace the waypoints 234, 236. Thus, according to the modified trajectory profile 242, the aircraft 100 travels past the virtual waypoint 246 instead of the waypoints 234, 236. Modifying at least one aspect of the initial trajectory profile 232 can include modifying a final point of the first turn in the initial trajectory profile 232 and performing a course capture on an outbound course associated with the second turn included in the initial trajectory profile 232.

The system 200 of FIG. 2 thus enables dynamic modification to the initial trajectory profile 232 in response to impermissible flight conditions. As a non-limiting example, the initial trajectory profile 232 can indicate that the first turn terminates past the point that the next turn must be initiated and thus results in a violation of one of the set of operational rules 222. For example, the aircraft 100 cannot start the turn for the next leg until it completes the turn for the previous leg, which violates the operational rule 226. Thus, to ensure compliance with the set of operational rules 222, the flight management system 202 modifies the initial trajectory profile 232 to generate the modified trajectory profile 242 to facilitate compliance with the operational rule 226.

Figure 3:
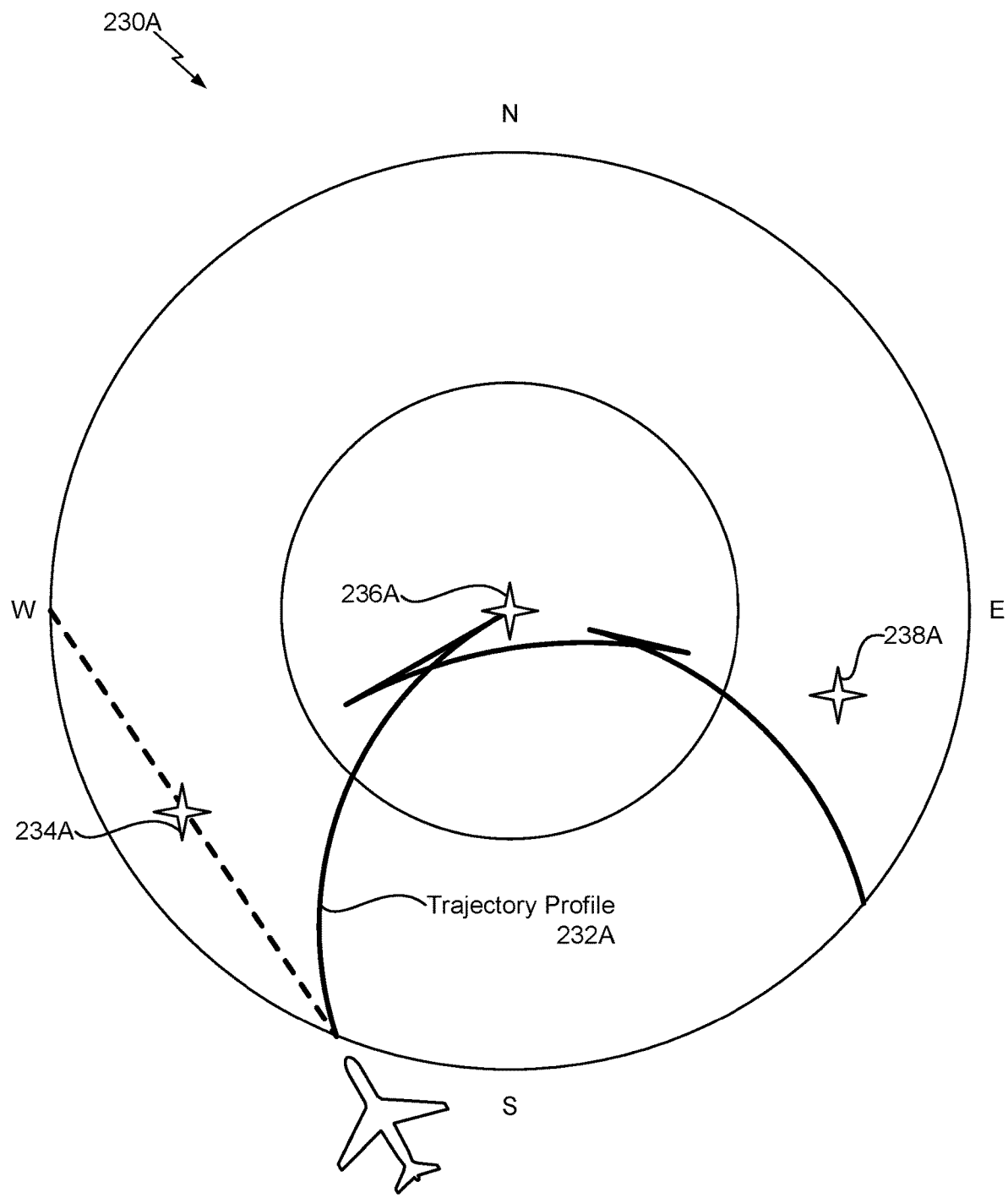
FIG. 3 is a diagram of a flight plan having a non-flyable trajectory profile based on an impermissible flight condition.

Referring to FIG. 3, a diagram of a flight plan 230A having a trajectory profile 232A (e.g., a non-flyable trajectory profile) based on an impermissible flight condition is shown. According to one implementation, the flight plan 230A corresponds to the flight plan 230 of FIG. 2. The flight plan 230A includes a first waypoint 234A, a second waypoint 236A, and a third waypoint 238A. If the aircraft 100 travels according to the trajectory profile 232A, the aircraft 100 is to fly proximate to the first waypoint 234A and turn towards the second waypoint 236A. After flying proximate to the second waypoint 236A, the aircraft 100 is to turn towards the third waypoint 238A.

However, in the illustrative example of FIG. 3, the speed of the aircraft 100 creates an impermissible flight condition (e.g., a "fish-tail" bypass condition) that results in a flight path that violates at least one operational rule (e.g., a non-flyable path). As used herein, an "impermissible flight condition" may also be referred to as a "bypass condition." In the example of FIG. 5, the impermissible flight condition corresponds to the aircraft 100 flying at a relatively high speed that results in the aircraft completing the turn past the waypoint. Thus, the impermissible flight condition violates at least one operational rule of the set of operational rules 222 (e.g., the turn must be completed prior to reaching the second waypoint 236A). As a result, the trajectory profile 232A for the aircraft 100 between the second waypoint 236A and the third waypoint 238A is non-flyable (e.g., includes an impermissible flight condition), and following the trajectory profile 232A would result in autopilot disengaging or the flight crew unable to stay on course.

Figure 4:
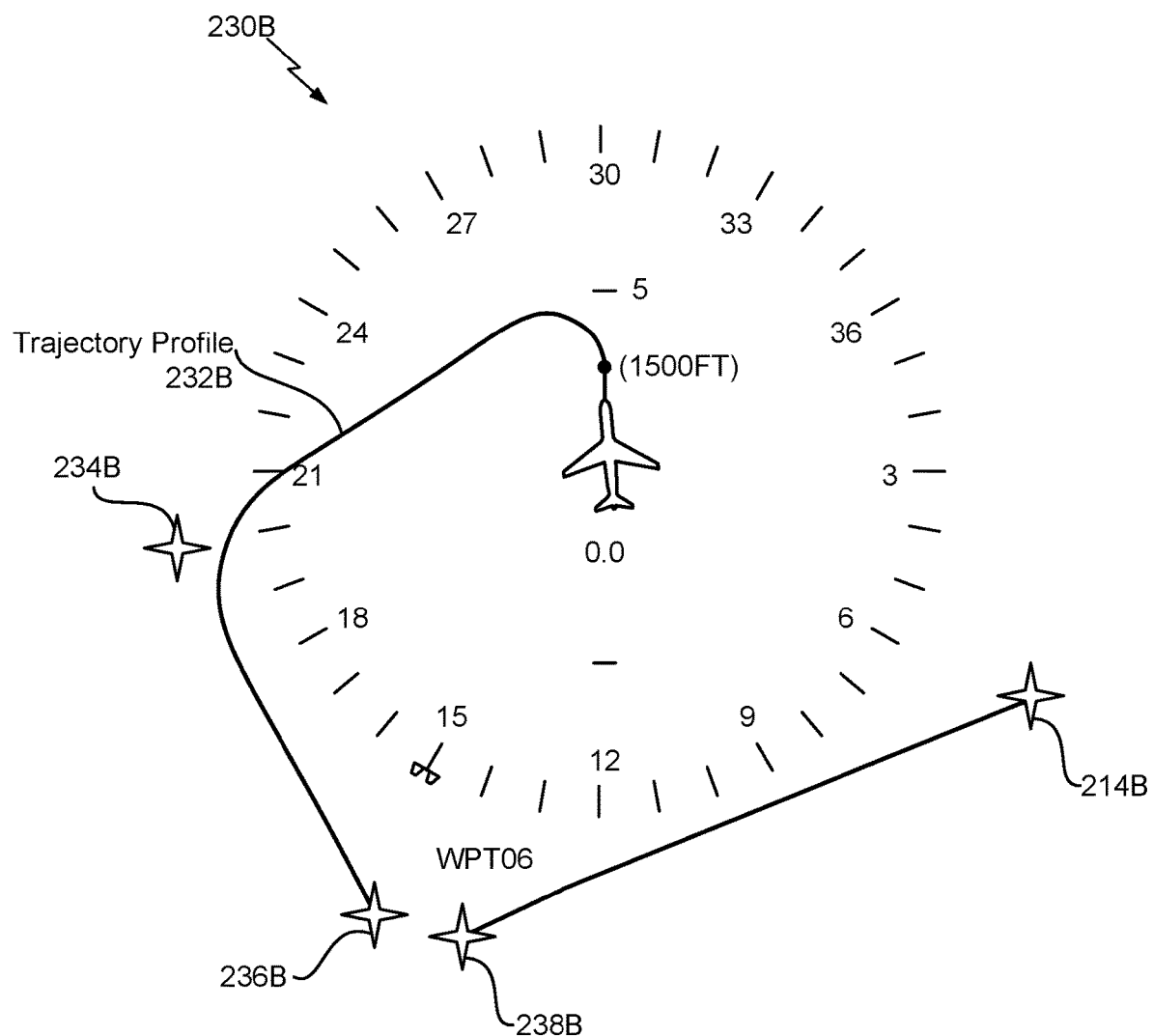
FIG. 4 is a diagram of another flight plan having a non-continuous trajectory profile based on an impermissible flight condition.

Referring to FIG. 4, a diagram of another flight plan 230B having a trajectory profile 232B (e.g., a non-continuous trajectory profile) based on an impermissible flight condition is shown. According to one implementation, the flight plan 230B corresponds to the flight plan 230 of FIG. 2. The flight plan 230B includes a first waypoint 234B, a second waypoint 236B, a third waypoint 238B, and a destination 214B. If the aircraft 100 travels according to the trajectory profile 22B, the aircraft 100 is to fly past the first waypoint 234B and turn towards the second waypoint 236B. After flying past the second waypoint 236B, the aircraft 100 is to turn towards the third waypoint 238B. After flying past the third waypoint 238B, the aircraft 100 is to turn towards the destination 214B.

However, in the illustrative example of FIG. 4, an impermissible flight condition results in a flight path that violates at least one operational rule (e.g., a non-continuous path). For example, due to proximity of the second waypoint 236B and the third waypoint 238B, the aircraft 100 is unable to perform a turn that travels through the second waypoints 236B and the third waypoint 238B and that complies with the set of operational rules 222. Because the impermissible flight condition violates at least one operational rule of the set of operational rules 222, the impermissible flight condition creates a discontinuity between the second waypoint 236B and the third waypoint 238B. The impermissible flight condition can be caused by the speed of the aircraft 100, the proximity of the second waypoint 236B, the proximity of the third waypoint 238B, etc. As a result, a trajectory profile 232B for the aircraft 100 between the second waypoint 236B and the third waypoint 238B is non-continuous, and following the trajectory profile 232B would result in an error condition.

FIG. 5 is a diagram that is indicative of a process 500 to determine whether an impermissible flight condition is present. The process 500 can be performed using a rule-based decision engine, such as flight management system 202, to detect if an impermissible flight condition is present. If an impermissible flight condition is present, one or more corrective algorithms are performed by the flight management system 202 to generate a smooth and continuous flight trajectory profile (e.g., the modified trajectory profile 242).

The process 500 determines whether a turn cannot achieve tangency with a way-line between two waypoints 234C, 236C, whether the turn is tangent on the way-line in a manner that otherwise results in a same-side turn or an S-turn, or both. As used herein, a "same-side turn" refers to a flight condition where a turn transitions to the same side (e.g., either the left or right) for two consecutive waypoints. As used herein, an "S-turn" refers to a flight condition where the turn transitions in opposite directions for two consecutive waypoints. As used herein, each turn may have an initial/beginning turn point (ITP) and a final/end turn point (FTP).

According to the process 500, an impermissible flight condition is present if an end of a first turn ($FTP_1$) does not lie on the way-line between the waypoint ($WTP_1$) and a subsequent waypoint ($WTP_2$). For example, the impermissible flight condition is present if the end of the first turn ($FTP_1$) lies on the way-line but is located outside the line bounded between the waypoint 234C and the waypoint 236C. The test to determine whether the impermissible flight condition exists can be performed by comparing the absolute value of respective segment lengths $|FTP_1-WPT_1|$ and $|WPT_2-WPT_1|$. If $|FTP_1-WPT_1| \ge |WPT_2-WPT_1|$, then the end of the first turn ($FTP_1$) is outside the way-line between the waypoints 234C, 236C and the impermissible flight condition is present.

Figure 6:
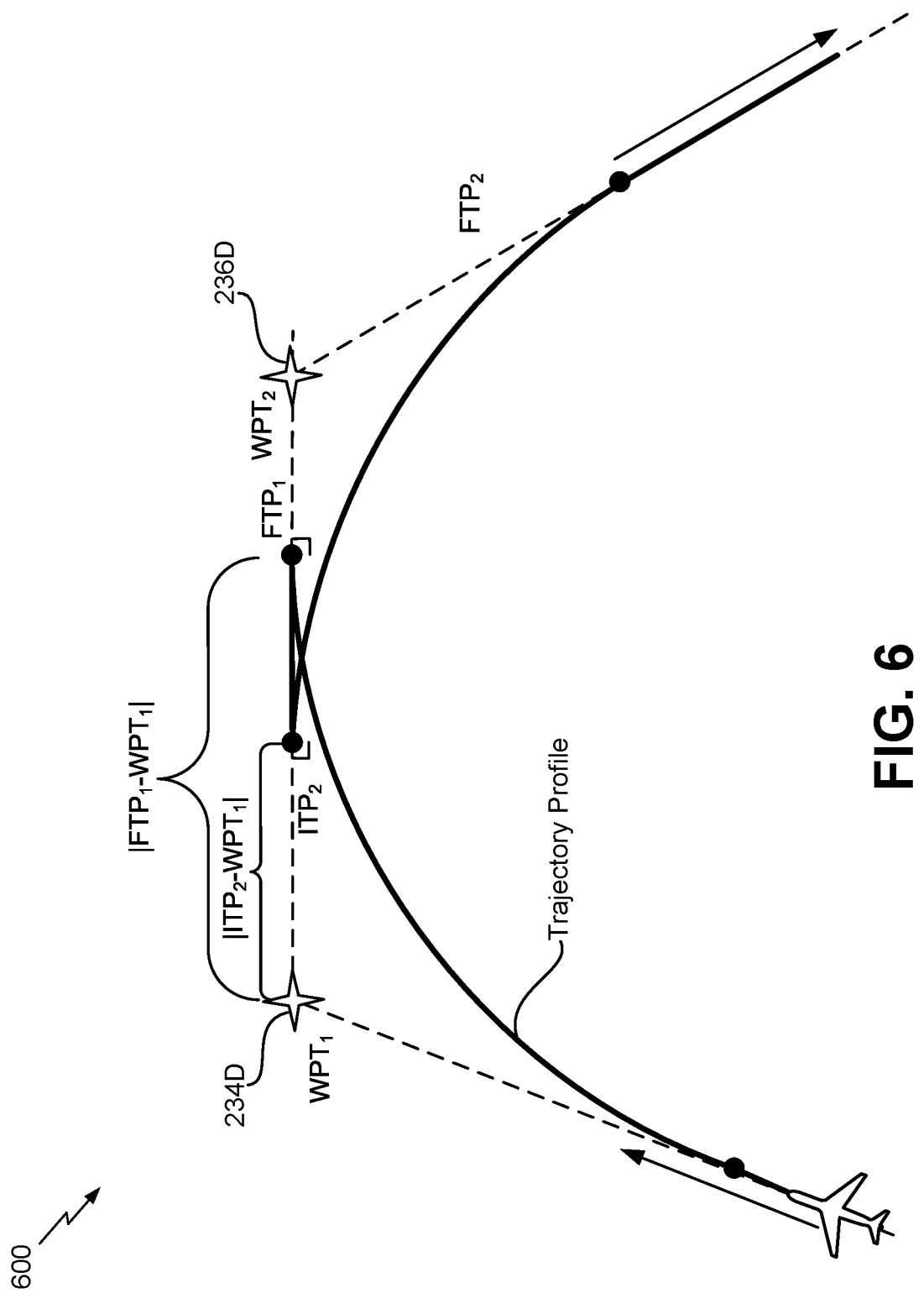
FIG. 6 is a diagram that is indicative of another process to determine whether an impermissible flight condition is present.

FIG. 6 is a diagram that is indicative of a process 600 to determine whether an impermissible flight condition is present. The process 600 can be performed using a rule-based decision engine, such as flight management system 202, to detect if an impermissible flight condition is present. If an impermissible flight condition is present, one or more corrective algorithms are performed by the flight management system 202 to generate a smooth and continuous trajectory profile (e.g., the modified trajectory profile 242).

According to the process 600, an impermissible flight condition is present if an end of a first turn ($FTP_1$) lies on a way-line between the waypoint 234D and a subsequent waypoint 236D, but a beginning of a second turn ($ITP_2$) is between the end of the first turn ($FTP_1$) and the waypoint 234D. For example, if the expression ($|FTP_1-WPT_1| \ge |ITP_2-WPT_1|$) is true, the end of the first turn (FTP$_1$) is too far past the beginning of the second turn (ITP$_2$) and the impermissible flight condition is present.

Additionally, or in the alternative, for an arc to fixed (AF) leg if the course change at the start and/or end of the leg is large, and the groundspeed of the aircraft 100 is also high, then it may be impossible for the normal path construction routines to result in a path that converges on the desired flight plan intent, resulting in an impermissible flight condition. A bypass detection scenario for an AF leg is described in greater detail with respect to FIG. 7, and a bypass resolution for an AF leg is described in greater detail with respect to FIG. 31.

According to another implementation, a test for consecutive bypass conditions can be performed by the flight management system 202. For example, the flight management system 202 can execute an algorithm where an intermediate waypoint is dropped in the construction of a trajectory profile to create a smooth and continuous trajectory. The test includes identifying scenarios where three or more bypass waypoints (e.g., waypoints associated with an impermissible flight condition) are in adjacent flight plan legs. If there are three or more bypass waypoints in succession, a subsequent test can check to verify whether there are more than two waypoints within a turn radius of each other. Additional details are provided with respect to FIG. 22.

According to another implementation, if an entry turn to the AF/RF leg is non-tangent, the flight management system 202 can verify whether a transition can be constructed with a straight section between the first two turns and the end of the second turn is on the arc prior to the arc departure point. If the construction cannot include a straight segment without extending the end of the second turn (FTP$_2$) past the beginning of the third turn (ITP$_3$), then an impermissible flight condition is present. If the entry to the arc is greater than ninety degrees, the flight management system 202 can verify whether the arc radius is greater than the turn radius for the current environment and airplane speed. If the speed and winds prevent capture and tracking the arc, an impermissible flight condition is present.

Figure 7:
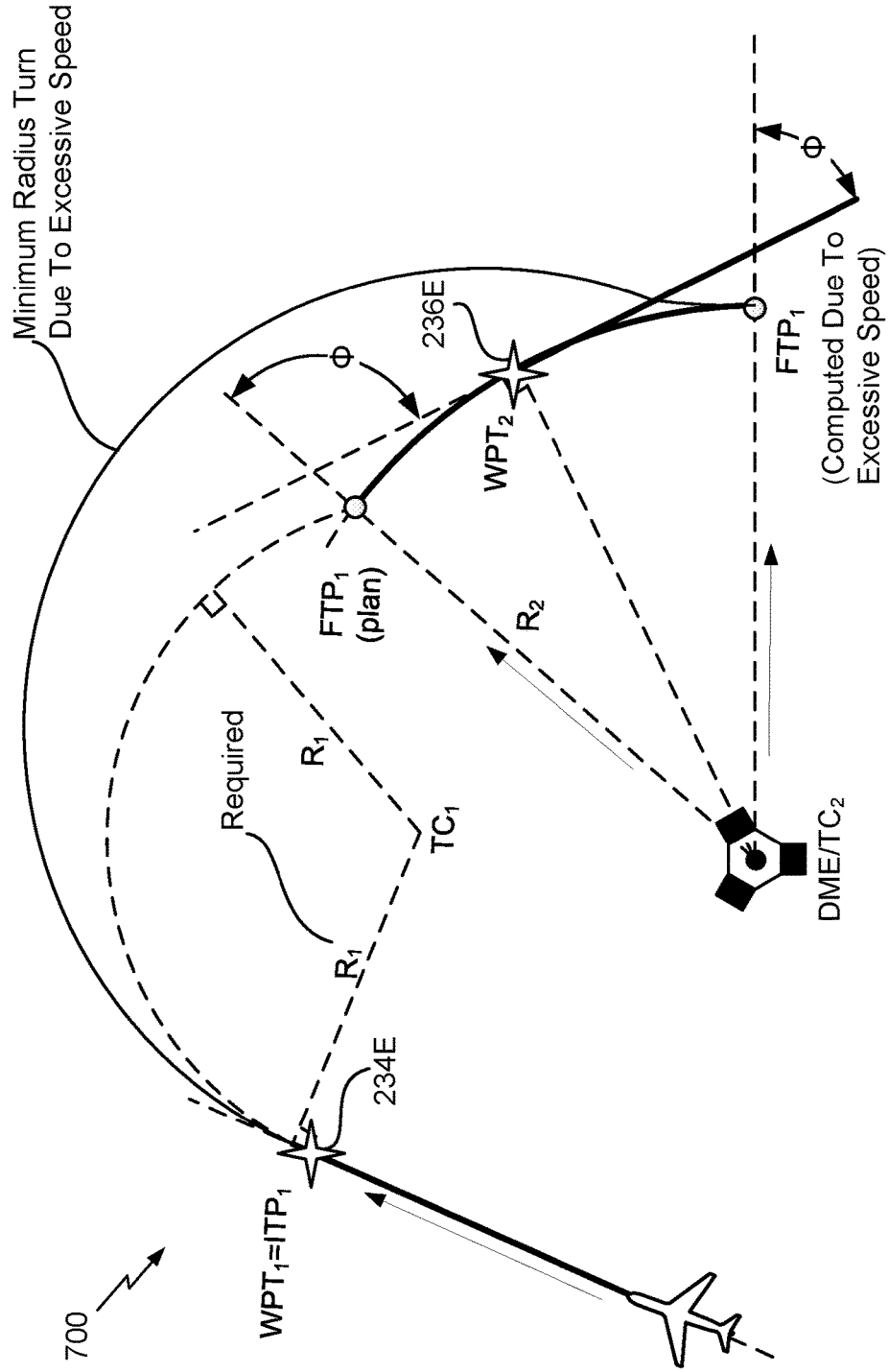
FIG. 7 is a diagram that is indicative of another process to determine whether an impermissible flight condition is present.

FIG. 7 is a diagram that is indicative of a process 700 to determine whether an impermissible flight condition is present. The process 700 can be performed using a rule-based decision engine, such as flight management system 202, to detect if an impermissible flight condition is present. If an impermissible flight condition is present, one or more corrective algorithms can be performed by the flight management system 202 to generate a smooth and continuous flight trajectory profile (e.g., the modified trajectory profile 242).

According to the process 700, the flight management system 202 can determine a course from the turn center of the end of a first turn (FTP$_1$) and the angle to the AF/RF waypoint (e.g., the waypoint 236E). If the end of the first turn (FTP$_1$) is past the waypoint 236E on the arc, then an impermissible flight condition is present. In order to determine whether the end of the first turn (FTP$_1$) is past the waypoint 236E, the flight management system 202 can compare the cosine of the angle between the course from distance measuring equipment (DME) to the end of the first turn (FTP$_1$) and the angle between the DME to the outbound course. An impermissible flight condition is present if the cosines are opposite signs.

According to another implementation of the process 700, the flight management system 202 can determine the course change between the AF/RF turn center to TC$_1$ and the AF/RF turn center to the waypoint 234E. An impermissible flight condition is present if the course change is smaller than the AF/RF turn center to TC$_1$ and AF/RF turn center to the end of the first turn (FTP$_1$).

Figure 8:
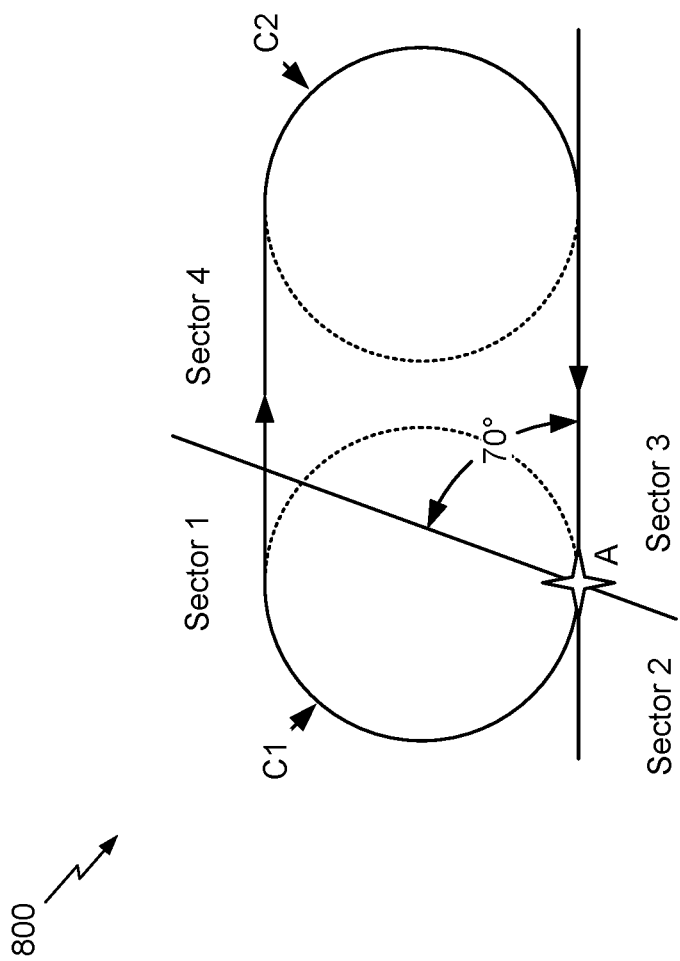
FIG. 8 is a diagram that illustrates hold entry sectors.

FIG. 8 depicts a diagram that illustrates hold entry sectors 800. The hold entry sectors 800 include a first sector (Sector 1), a second sector (Sector 2), a third sector (Sector 3), and a fourth sector (Sector 4). The hold entry is associated with the aircraft 100 flying in a hold pattern through waypoint (A). As described with respect to FIGS. 9-11, the flight management system 202 can apply algorithms to different sectors of the hold entry sectors 800 to detect if an impermissible flight condition is present. If an impermissible flight condition is present, one or more corrective algorithms are performed by the flight management system 202 to generate a smooth and continuous trajectory profile. If the aircraft's position and velocity are such that the standard hold entry procedure does not result in successfully entering the hold, an impermissible flight condition is present.

FIG. 9 depicts diagrams 900 that are indicative of a process to determine whether an impermissible flight condition is present using the third sector (Sector 3). The flight management system 202 determines an angle (a) as the angle the intercept vector crosses the segment.

For the third sector (Sector 3), the flight management system 202 determines the point (P) from the tangent of the turn radius centered at TC$_1$ if the angle (a$_1$) is less than or equal to ninety degrees. Otherwise, the flight management system 202 determines the point (P) from the tangent of the turn radius centered at TC$_2$. If the angle (a) is less than or equal to thirty degrees, the flight management system 202 determines the destination point is point (4) if the intercept point is left of the point (P). Otherwise, the destination point is point (2). If the angle (a) is greater than thirty degrees and less than one hundred and fifty degrees, the flight management system 202 determines the destination point is point (3) if the intercept point is left of the point (P). Otherwise, the intercept point is point (2). If the angle (a) is greater than one hundred and fifty degrees, the flight management system 202 determines the destination point is point (3) if the intercept point is left of the point (P). Otherwise, the destination point is point (1).

Figure 10:
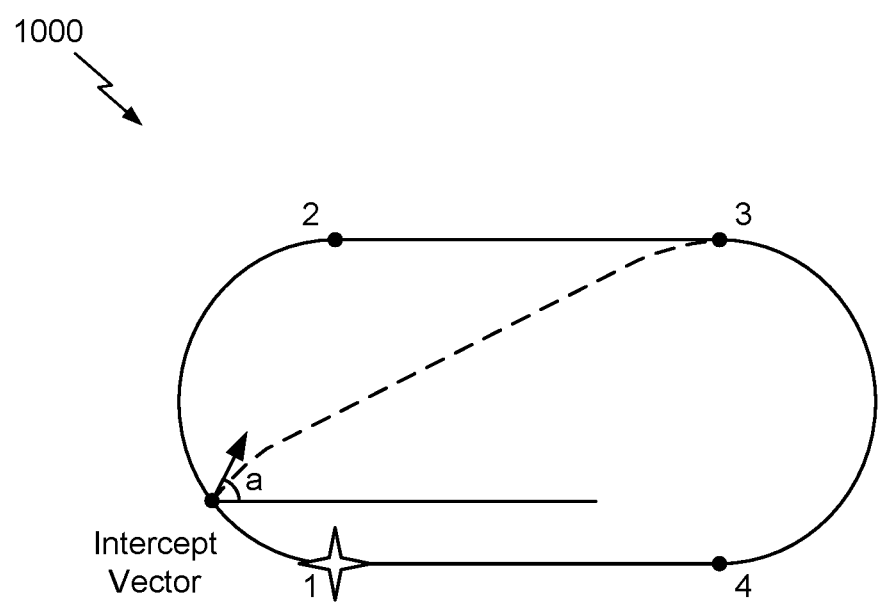
FIG. 10 depicts a diagram that is indicative of a process to determine whether an impermissible flight condition is present using another particular hold entry sector.

Referring to FIG. 10, depicts a diagram 1000 that is indicative of a process to determine whether an impermissible flight condition is present using the second sector (Sector 2). The flight management system 202 determines an angle (a) as the angle the intercept vector crosses the segment relative to the inbound course of the holding fix. For the second sector (Sector 2), if the angle (a) is greater than zero degrees, the flight management system 202 determines the destination point is point (3). Otherwise, the destination point is point (1).

Figure 11:
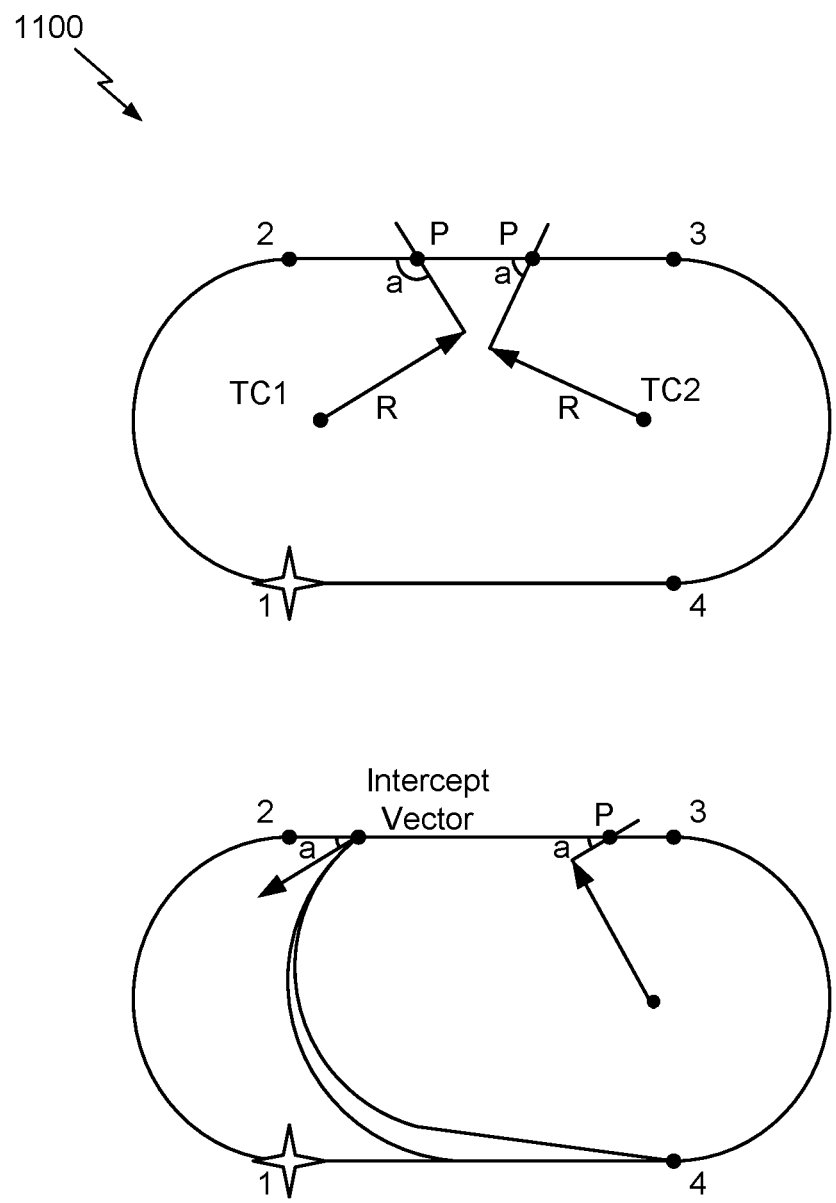
FIG. 11 depicts diagrams that are indicative of a process to determine whether an impermissible flight condition is present using another particular hold entry sector.

FIG. 11 depicts diagrams 1100 that are indicative of a process to determine whether an impermissible flight condition is present using the first sector (Sector 1). The flight management system 202 determines an angle (a) as the angle the intercept vector crosses the segment.

For the first sector (Sector 1), the flight management system 202 determines the point (P) from the tangent of the turn radius centered at TC$_2$ if the angle (a) is less than or equal to ninety degrees. Otherwise, the flight management system 202 determines the point (P) from the tangent of the turn radius centered at TC$_1$. If the angle (a) is less than or equal to one hundred and fifty degrees but greater than ninety degrees, the flight management system 202 determines the destination point is point (4) if the intercept point is left of the point (P). Otherwise, the destination point is point (1). If the angle (a) is greater than one hundred and fifty degrees, the flight management system 202 determines the destination point is point (3) if the intercept point is left of the point (P). Otherwise, the intercept point is point (1).

Figure 12:
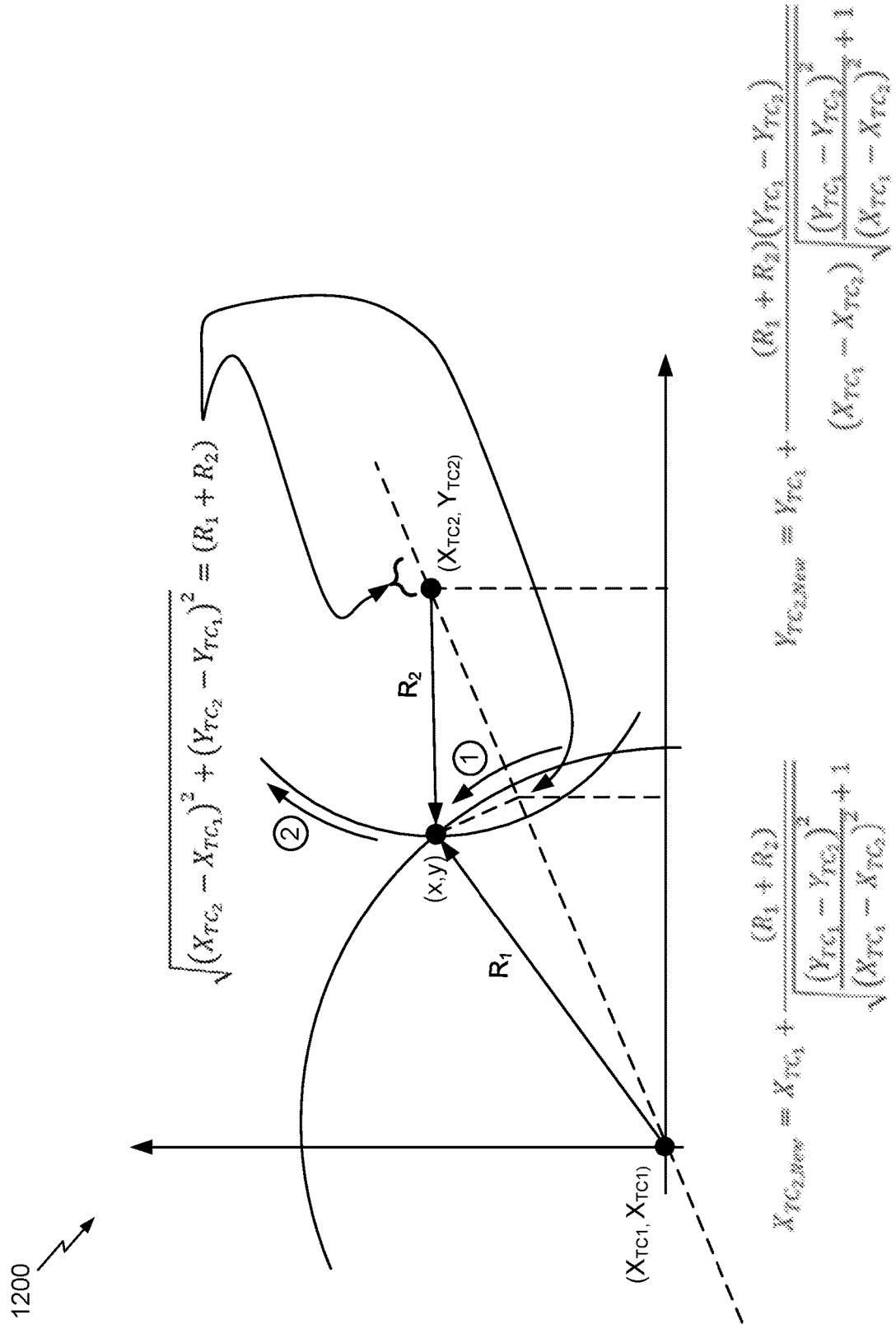
FIG. 12 depicts a diagram of a process for adjusting a trajectory profile.

Referring to FIG. 12, a diagram of a process 1200 for adjusting a trajectory profile is shown. The process 1200 can be performed by flight management system 202 of FIG. 2. The process 1200 illustrates an example of modifying at least one aspect (e.g., the second segment 262) of the initial trajectory profile 232 by modifying at least one of a location of a center of a first turn included in the second segment 262 of the initial trajectory profile 232, modifying a location of a center of a second turn included in the second segment 262 of the initial trajectory profile 232, or both. The second turn may be immediately subsequent to the first turn in the initial trajectory profile 232.

For example, after an impermissible flight condition is detected, the flight management system 202 applies one or more correction algorithms to create a smooth and continuous trajectory profile (e.g., the modified trajectory profile 242) for the aircraft 100 based on the flight conditions 250. For the scenario where the S-turn produces a "bi-quad" impermissible flight condition, the flight management system 202 can select an algorithm described with respect to FIG. 12 using a rule-based decision.

In FIG. 12, one of the two turn centers is translated along the line formed between the turn centers deterministically such that the intersection of the turn arcs, independent of radius, are tangent and lie on the line formed between the two waypoints. Tangency is achieved when the length of the distance between the turn centers is $(R_1+R_2)$. The resulting trajectory moves the end of the first turn $(FTP_1)$ and the beginning of the second turn $(ITP_2)$ such that they meet at a tangent point on their respective turn arcs. FIG. 12 also illustrates a closed-form algorithm (e.g., equations) used by the modification circuit 270 to determine distance to move the turn centers.

Figure 13A:
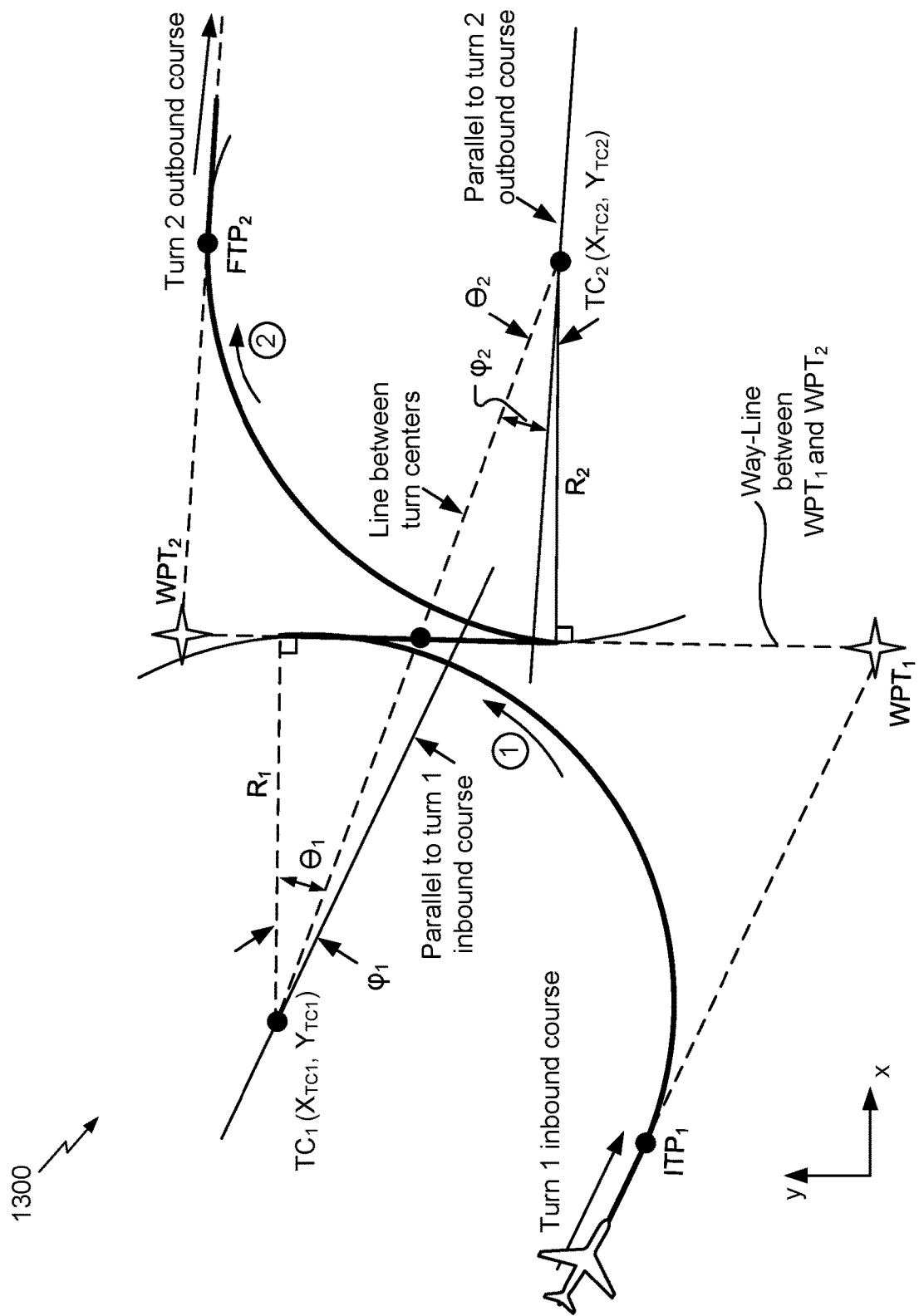
FIG. 13A depicts a diagram of another process for adjusting a trajectory profile.
Figure 13B:
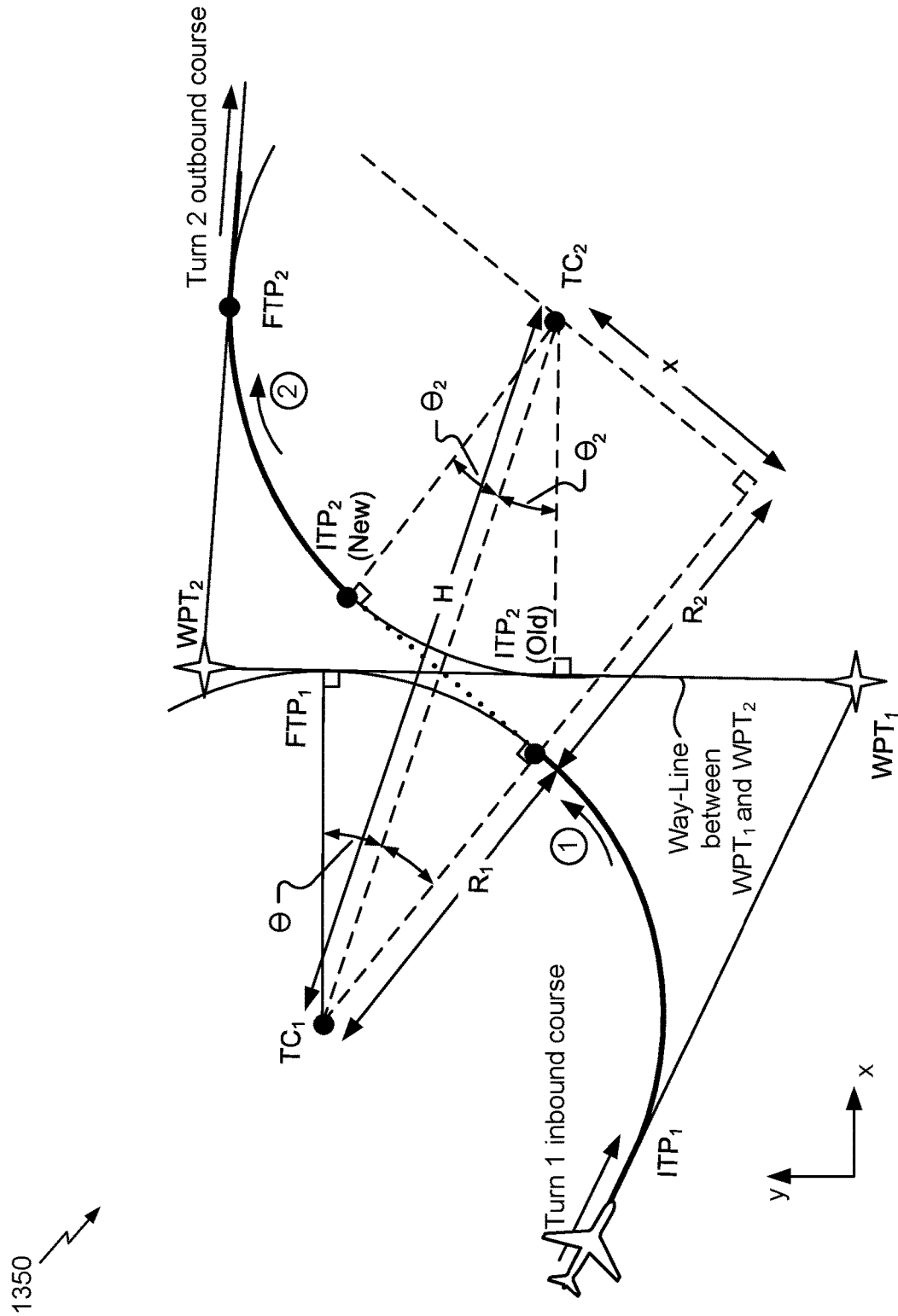
FIG. 13B depicts a diagram of another process for adjusting a trajectory profile.

Referring to FIGS. 13A-13B, a diagram of processes 1300, 1350 for adjusting a trajectory profile is shown. The processes 1300, 1350 can be performed by flight management system 202 of FIG. 2. The processes 1300, 1350 illustrate examples of modifying at least one aspect (e.g., the second segment 262) of the initial trajectory profile 232 by modifying at least one of a location of a center of a first turn included in the second segment 262 of the initial trajectory profile 232, modifying a location of a center of a second turn included in the second segment 262 of the initial trajectory profile 232, or both. The second turn may be immediately subsequent to the first turn in the initial trajectory profile 232.

For example, after an impermissible flight condition is detected, the flight management system 202 can apply one or more correction algorithms to create a smooth and continuous trajectory profile (e.g., the modified trajectory profile 242) for the aircraft 100 based on the flight conditions 250. For the scenario where the S-turn produces a "bi-quad" impermissible flight condition, the flight management system 202 can select algorithms described with respect to FIGS. 13A-13B using a rule-based decision.

In FIG. 13A, the two turn centers are translated along lines parallel to their respective first turn (Turn 1) inbound course and second turn (Turn 2) outbound course. The distance (dist.) to move each turn is expressed as $\text{dist}=R_x(\sec(\theta_x)-1)\cos(\varphi_x)$, where $R_x$ is the turn radius (x subscript can exclusively be=1 for turn 1 or x=2 for turn 2 in these equations), $\theta_x$ is the angle between the line between turn centers and the perpendicular line from the turn center to the way-line between waypoints, and $\varphi_x$ is the angle between the line between turn centers and a line parallel to the inbound or outbound course.

The resulting trajectory from the method described in FIG. 12 results in the end of the first turn $(FTP_1)$ being coincident to the beginning of the second turn $(ITP_2)$ so the aircraft 100 follows a trajectory between the waypoints where the two turns are connected. However, in the method described in FIG. 13B, the resulting trajectory includes a straight section. While an autopilot could connect the two turns with a smooth, constant roll rate, pilots can have a level flight segment between the turns to allow for roll-anticipation allowance to mitigate the risk of departing the trajectory profile.

Figure 14:
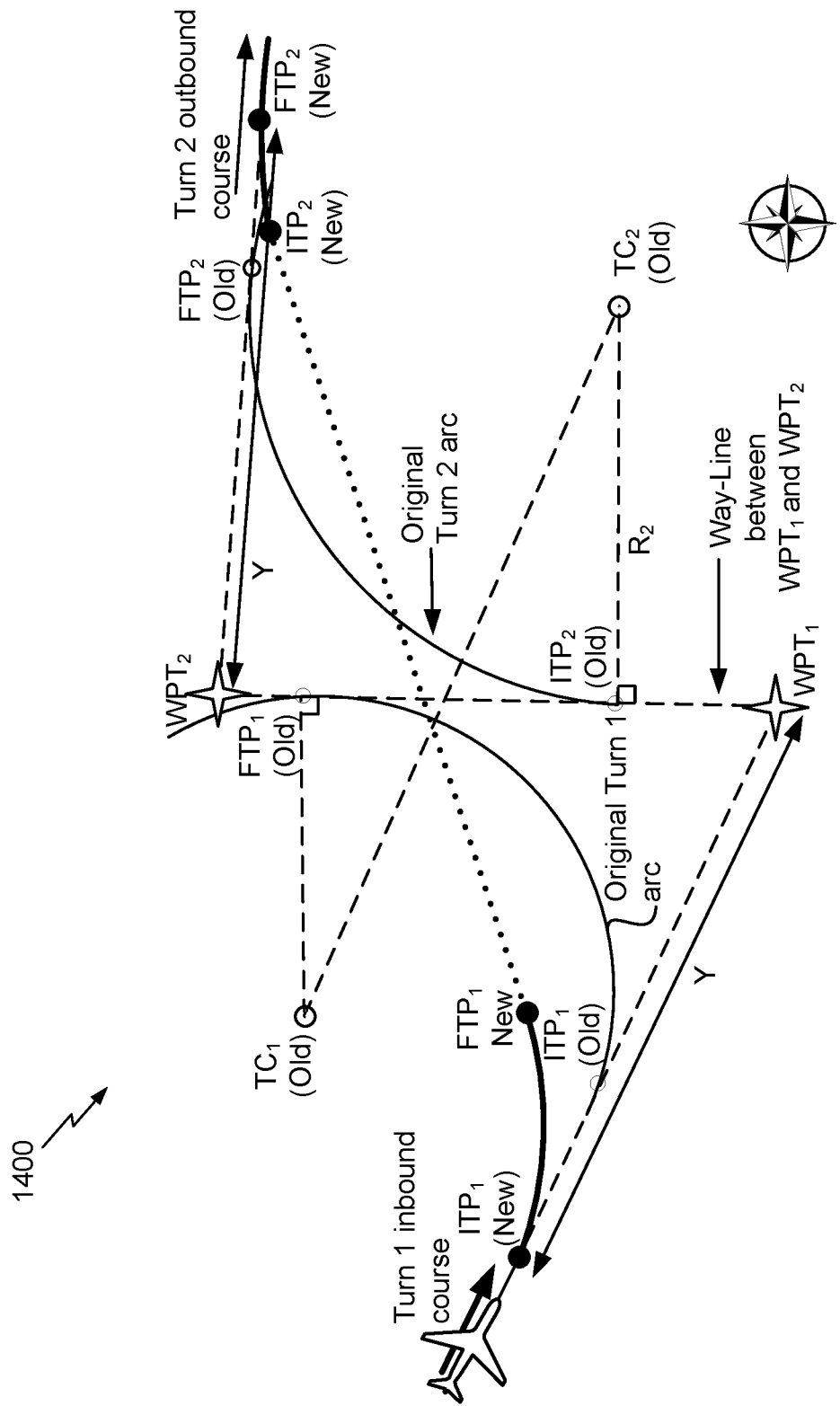
FIG. 14 depicts a diagram of another process for adjusting a trajectory profile.

Referring to FIG. 14, a diagram of a process 1400 for adjusting a trajectory profile is shown. The process 1400 can be performed by flight management system 202 of FIG. 2. The process 1400 illustrates an example of modifying at least one aspect (e.g., the second segment 262) of the initial trajectory profile 232 by modifying at least one of a location of a center of a first turn included in the second segment 262 of the initial trajectory profile 232, modifying a location of a center of a second turn included in the second segment 262 of the initial trajectory profile 232, or both. The second turn may be immediately subsequent to the first turn in the initial trajectory profile 232. The process 1400 also implements a course capture routine to modify the initial trajectory profile 232.

For example, after an impermissible flight condition is detected, the flight management system 202 applies one or more correction algorithms to create a smooth and continuous trajectory profile (e.g., the modified trajectory profile 242) for the aircraft 100 based on the flight conditions 250. For the scenario where the S-turn produces a "bi-quad" impermissible flight condition, the flight management system 202 can select an algorithm described with respect to FIG. 14 using a rule-based decision.

A turn-straight-turn transition correction can be constructed for the S-turn impermissible flight condition. For example, a line is formed that connects a first turn (Turn 1) and a second turn (Turn 2) tangent to both arcs. The end of the first turn $(FTP_1)$ is moved from a first waypoint $(WPT_1)$ outbound course to the intersection of a new line and a corresponding arc. Similarly, the beginning of the second turn $(ITP_2)$ is moved from the second waypoint $(WPT_2)$ inbound course to the tangent point intersection with the second turn (Turn 2) arc. Thus, the process 1400 adds a straight segment between two turns.

In FIG. 14, the process 1400 can also constructs a turn-straight-turn transition correction for the S-turn impermissible flight condition. For example, a point on the first waypoint $(WPT_1)$ inbound course is selected such that when a line is extended from that point at a predetermined departure angle from the inbound course, the intercept point on the second waypoint $(WPT_2)$ outbound course is approximately the same distance to the second waypoint $(WPT_2)$ as the departure point is on its inbound course to the first waypoint $(WPT_1)$. Course-capture maneuvers can be utilized to transition from the inbound course to the straight section and to intercept the second waypoint $(WPT_2)$ outbound course. The beginning of first turn $(ITP_1)$ and the target point on the second waypoint $(WPT_2)$ outbound course are found by geodetic projection from the respective waypoints using an offset distance. If the construction of the bypass result in a trajectory that does not cross the way-line between the waypoints, the distance from the waypoints can be reduced to ensure that the aircraft 100 passes between the waypoints on the S-turn bypass.

The process 1400 can be enhanced by utilizing different distances for the inbound and outbound turn points. The inbound and outbound distances from the waypoints are determined such that the straight segment intersects at (or near) the midpoint of the way-line between the first waypoint (WPT$_1$) and the second waypoint (WPT$_2$). The flight path of the transition is reduced and the course departure and intercept angles are within a particular range. The flight path is aesthetically acceptable to flight crews and the straight segment is equal to (or greater than) the roll-anticipation-distance for the second turn in the transition.

Figure 15:
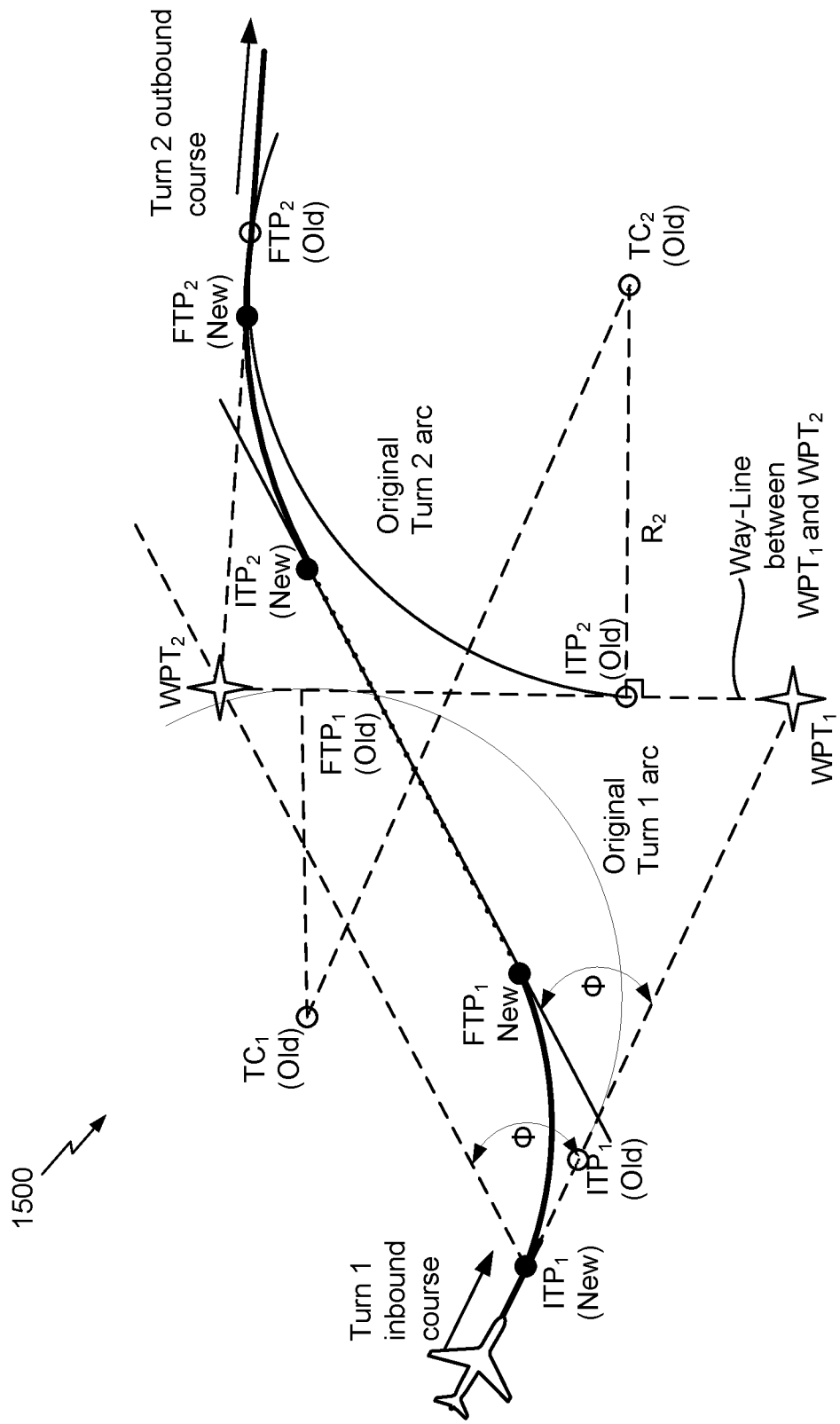
FIG. 15 depicts a diagram of another process for adjusting a trajectory profile.

Referring to FIG. 15, a diagram of a process 1500 for adjusting a trajectory profile is shown. The process 1500 can be performed by flight management system 202 of FIG. 2. The process 1500 illustrates an example of modifying at least one aspect (e.g., the second segment 262) of the initial trajectory profile 232 by inserting a straight segment between a first turn included in the second segment 262 of the initial trajectory profile 232 and a second turn included in the second segment 262 of the initial trajectory profile.

For example, after an impermissible flight condition is detected, the flight management system 202 applies one or more correction algorithms to create a smooth and continuous trajectory profile (e.g., the modified trajectory profile 242) for the aircraft 100 based on the flight conditions 250. For the scenario where the S-turn produces a "bi-quad" impermissible flight condition, the flight management system 202 can select an algorithm described with respect to FIG. 15 using a rule-based decision.

In FIG. 15, a point on the inbound course is selected where a line is extended from that point at a predetermined departure angle from the inbound course that would intercept the second waypoint (WPT$_2$). If the angle between the new segment and the second waypoint (WPT$_2$) outbound course results in a fly-by turn (i.e., the trajectory crosses the way-line between waypoints), a course capture is formed from the new line to the second waypoint (WPT$_2$) outbound course. If the turn from the new segment to the second waypoint (WPT$_2$) outbound course would result in the trajectory crossing the way-line outside of the two waypoints, the departure angle can be adjusted.

Figure 16:
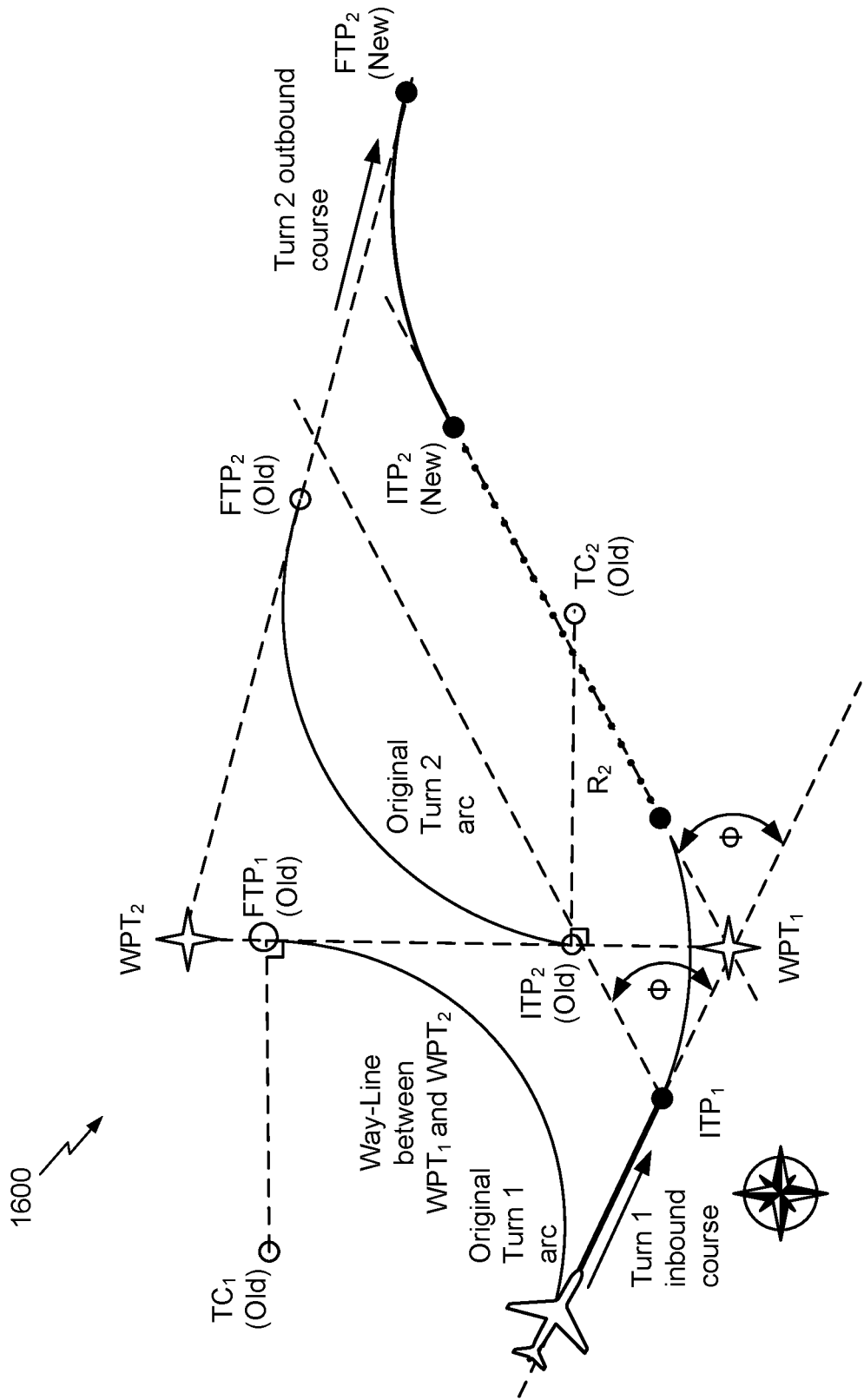
FIG. 16 depicts a diagram of another process for adjusting a trajectory profile.

Referring to FIG. 16, a diagram of a process 1600 for adjusting a trajectory profile is shown. The process 1600 can be performed by flight management system 202 of FIG. 2. The process 1600 illustrates an example of modifying at least one aspect (e.g., the second segment 262) of the initial trajectory profile 232 by inserting a straight segment between a first turn included in the second segment 262 of the initial trajectory profile 232 and a second turn included in the second segment 262 of the initial trajectory profile.

For example, after an impermissible flight condition is detected, the flight management system 202 applies one or more correction algorithms to create a smooth and continuous trajectory profile (e.g., the modified trajectory profile 242) for the aircraft 100 based on the flight conditions 250. For the scenario where the S-turn produces a "bi-quad" impermissible flight condition, the flight management system 202 can select an algorithm described with respect to FIG. 16 using a rule-based decision.

In FIG. 16, a point on the inbound course is selected where a line extended from that point at a predetermined departure angle from the inbound course would intercept the first waypoint (WPT$_1$). The straight segment is added on a course that is parallel to the projection and that intersects the first waypoint (WPT$_1$). As a result, the trajectory tracks closer to the first waypoint (WPT$_1$) and intersects the second waypoint (WPT$_2$) outbound course further down path. The departure angle is selected so that the turn can be constructed given the environmental conditions and the aircraft 100 speed.

Figure 17:
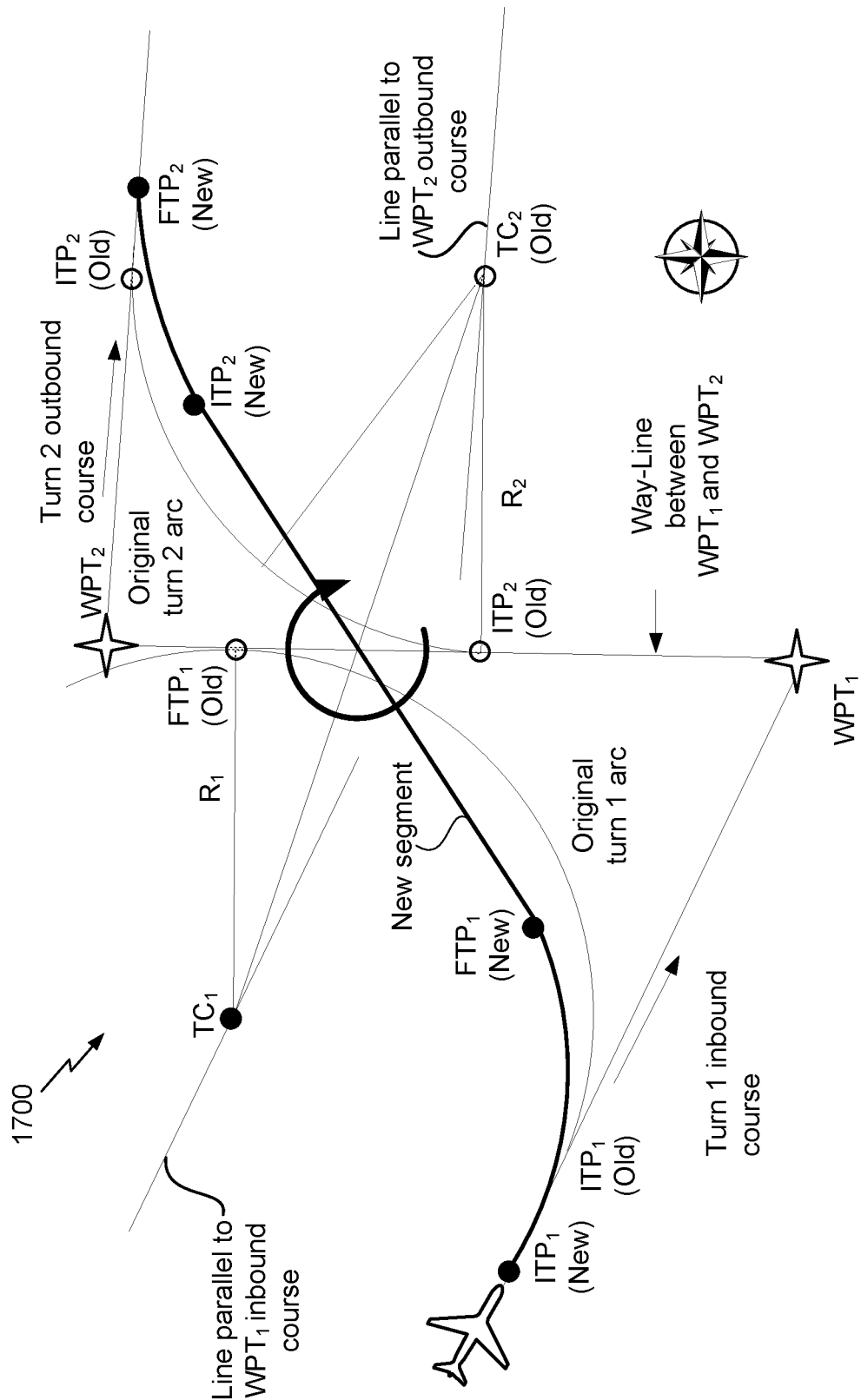
FIG. 17 depicts a diagram of another process for adjusting a trajectory profile.

Referring to FIG. 17, a diagram of a process 1700 for adjusting a trajectory profile is shown. The process 1700 can be performed by flight management system 202 of FIG. 2. The process 1700 illustrates an example of modifying at least one aspect (e.g., the second segment 262) of the initial trajectory profile 232 by inserting a straight segment between a first turn included in the second segment 262 of the initial trajectory profile 232 and a second turn included in the second segment 262 of the initial trajectory profile. According to the process 1700, the straight segment may be rotated.

For example, after an impermissible flight condition is detected, the flight management system 202 applies one or more correction algorithms to create a smooth and continuous trajectory profile (e.g., the modified trajectory profile 242) for the aircraft 100 based on the flight conditions 250. For the scenario where the S-turn produces a "bi-quad" impermissible flight condition, the flight management system 202 can select an algorithm described with respect to FIG. 17 using a rule-based decision.

According to the process 1700, turn centers are translated and then moved apart. For example, the first turn center (TC1) is moved along a line parallel to its inbound course and the second turn center (TC2) is moved along a line parallel to its outbound course until a straight segment tangent to the two turn arcs reaches a fixed distance. The fixed distance can be set to accomplish a maneuver goal such as being sufficient to achieve a particular roll-anticipation-distance for a particular turn radius and speed of the aircraft 100.

In FIG. 17, a straight segment is rotated about the tangent point on the way-line between the first waypoint (WPT1) and the second waypoint (WPT2). The turn centers on the respective inbound and outbound courses are translated until a desired distance of the straight segment is achieved, desired departure and intercept angles are achieved, or the total course change is reduced to achieve a desired sum of the first turn (Turn 1) course change angle and the second turn (Turn2) course change angle.

Figure 18:
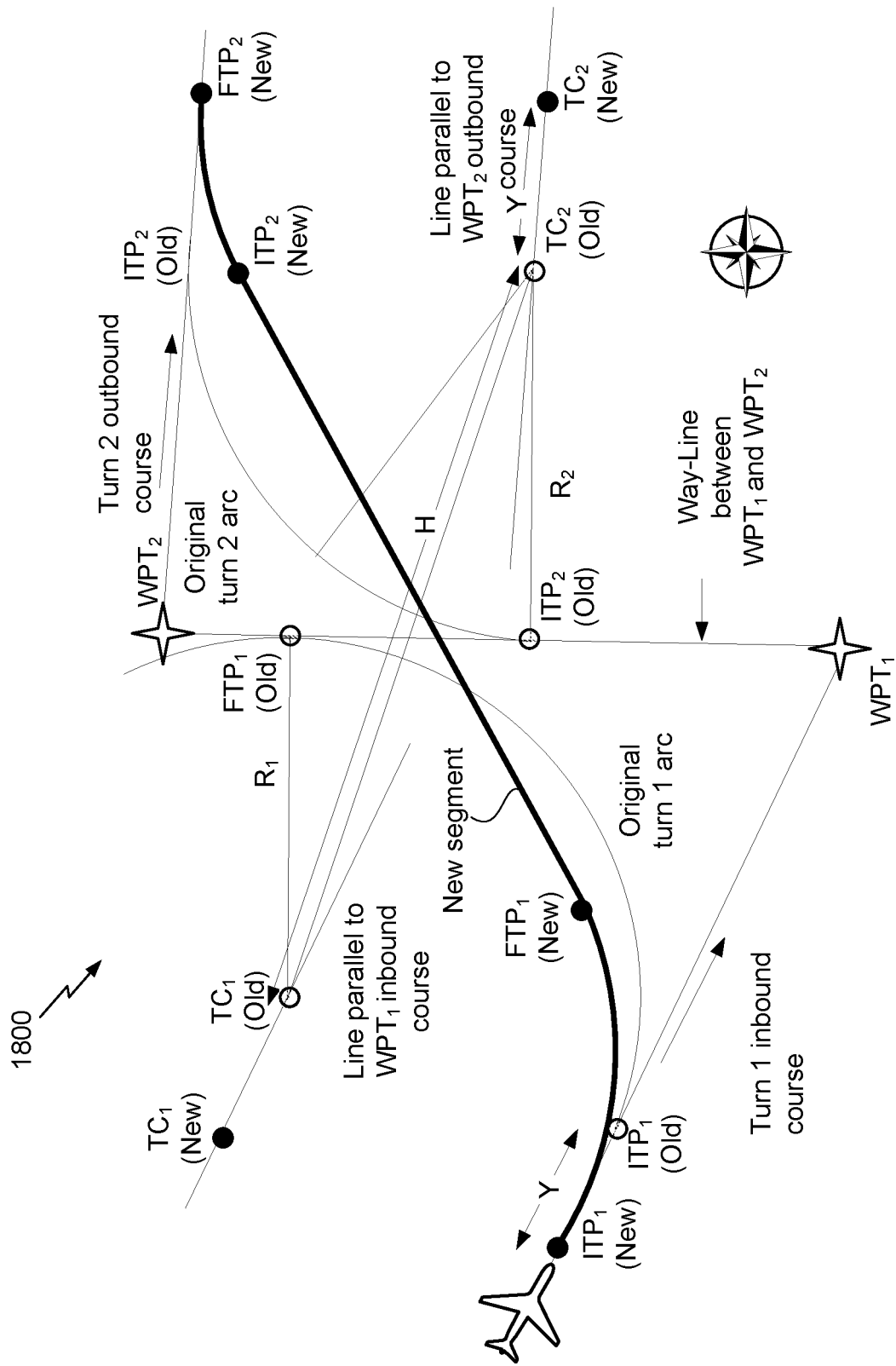
FIG. 18 depicts a diagram of another process for adjusting a trajectory profile.

Referring to FIG. 18, a diagram of a process 1800 for adjusting a trajectory profile is shown. The process 1800 can be performed by flight management system 202 of FIG. 2. The process 1800 illustrates an example of modifying at least one aspect (e.g., the second segment 262) of the initial trajectory profile 232 by inserting a straight segment between a first turn included in the second segment 262 of the initial trajectory profile 232 and a second turn included in the second segment 262 of the initial trajectory profile.

For example, after an impermissible flight condition is detected, the flight management system 202 applies one or more correction algorithms to create a smooth and continuous trajectory profile (e.g., the modified trajectory profile 242) for the aircraft 100 based on the flight conditions 250. For the scenario where the S-turn produces a "bi-quad" impermissible flight condition, the flight management system 202 can select an algorithm described with respect to FIG. 18 using a rule-based decision.

According to the process 1800, turn centers are translated and then moved apart. For example, the first turn center (TC$_1$) is moved along a line parallel to its inbound course and the second turn center (TC$_2$) is moved along a line parallel to its outbound course until a straight segment tangent to the two turn arcs reaches a fixed distance. The fixed distance can be set to accomplish a maneuver goal such as being sufficient to achieve a particular roll-anticipation-distance for a particular turn radius and aircraft 100 speed.

In FIG. 18, the first turn center ($TC_1$) and the second turn center ($TC_2$) are moved equal distances along their respective inbound and outbound courses until the straight segment is a particular distance. To avoid a "race condition", where backing up the beginning of the first turn ($ITP_1$) creates an impermissible flight condition with the previous transition or the subsequent transition, an additional process will gauge the impact of moving the beginning of the first turn ($ITP_1$) and the end of the second turn ($FPT_2$) on the previous and subsequent leg transitions.

Figure 19:
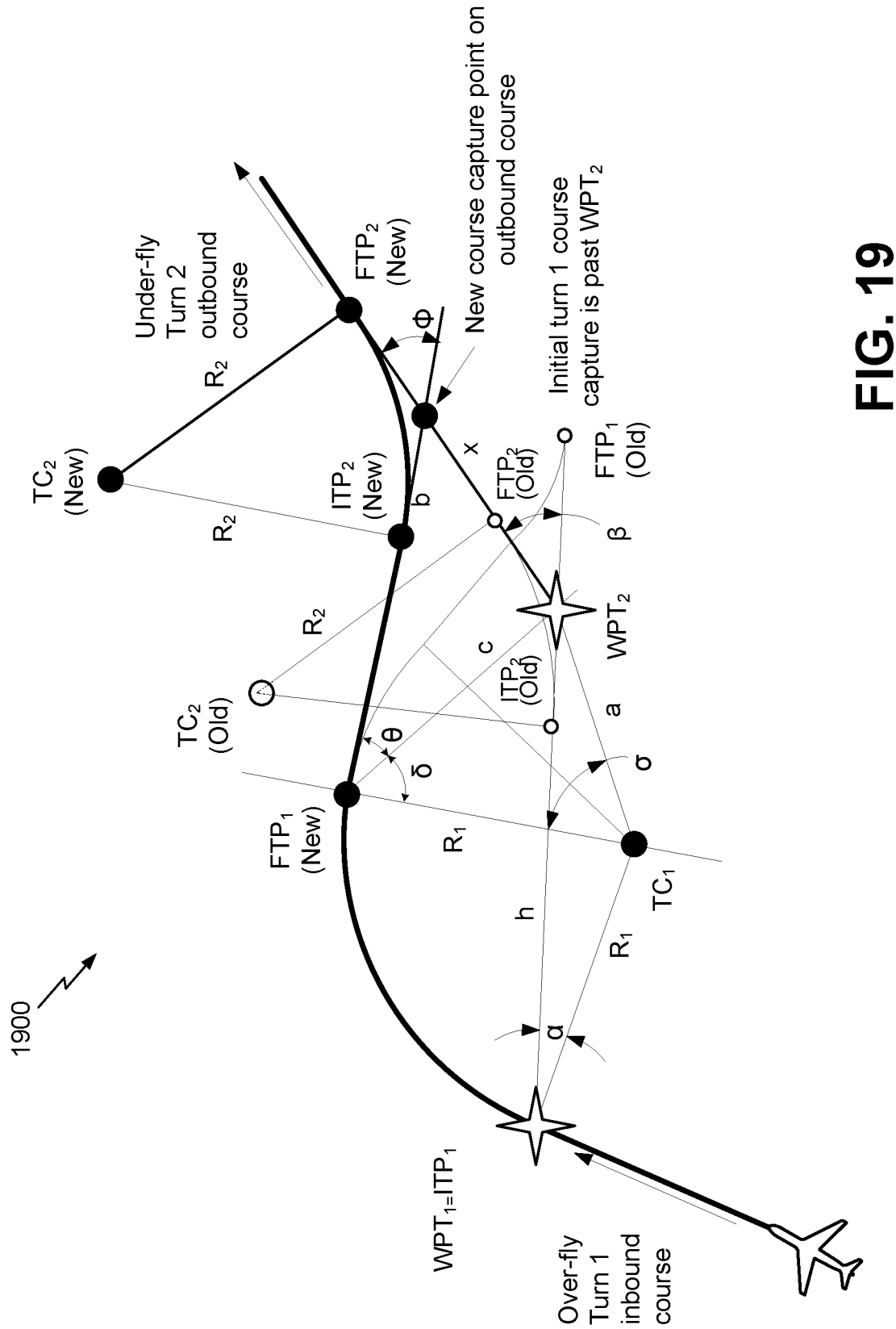
FIG. 19 depicts a diagram of another process for adjusting a trajectory profile.

Referring to FIG. 19, a diagram of a process 1900 for adjusting a trajectory profile is shown. The process 1900 can be performed by the flight management system 202 of FIG. 2. The process 1900 illustrates an example of modifying at least one aspect (e.g., the second segment 262) of the initial trajectory profile 232 by projecting a line segment from an outbound course by a course capture intercept angle.

According to the process 1900, fly-over of the first waypoint ($WPT_1$) results in course capture that is closer to the second waypoint ($WPT_2$) than the beginning of the second turn ($ITP_2$) or that is past the second waypoint ($WPT_2$). If the second waypoint ($WPT_2$) is a fly-by transition, the process 1900 creates a course capture to the second waypoint ($WPT_2$) outbound course using a predetermined intercept angle or angle range.

The bearing from the waypoint ($WPT_1$) to the waypoint ($WPT_2$) may be given from initial construction as is the bearing from the waypoint ($WPT_1$) to the turn center ($TC_1$). The bearing from the turn center ($TC_1$) is $BRG_{TC1\text{-}FTPnew} = BRG_{WPT1\text{-}WPT2} - \beta + \varnothing - 90°$. The distance between ($TC_1$) and the waypoint ($WPT_2$) is $a = \sqrt{R^2 + h^2 + hR_1 \sin\alpha}$. The course capture point of the outbound course from the waypoint ($WPT_2$) is given by $$x = c\frac{\sin\theta}{\sin\phi}.$$

If the second waypoint ($WPT_2$) is also a fly-over and the first waypoint ($WPT_1$) outbound courses capture is between the waypoints (or the overshoot of the courses is less than half the distance) of $R_2$, there is no impermissible flight condition. However, if the course capture is past the second waypoint ($WPT_2$) by more than half of $R_2$, the construction is the same as described with respect to FIG. 19.

Figure 20:
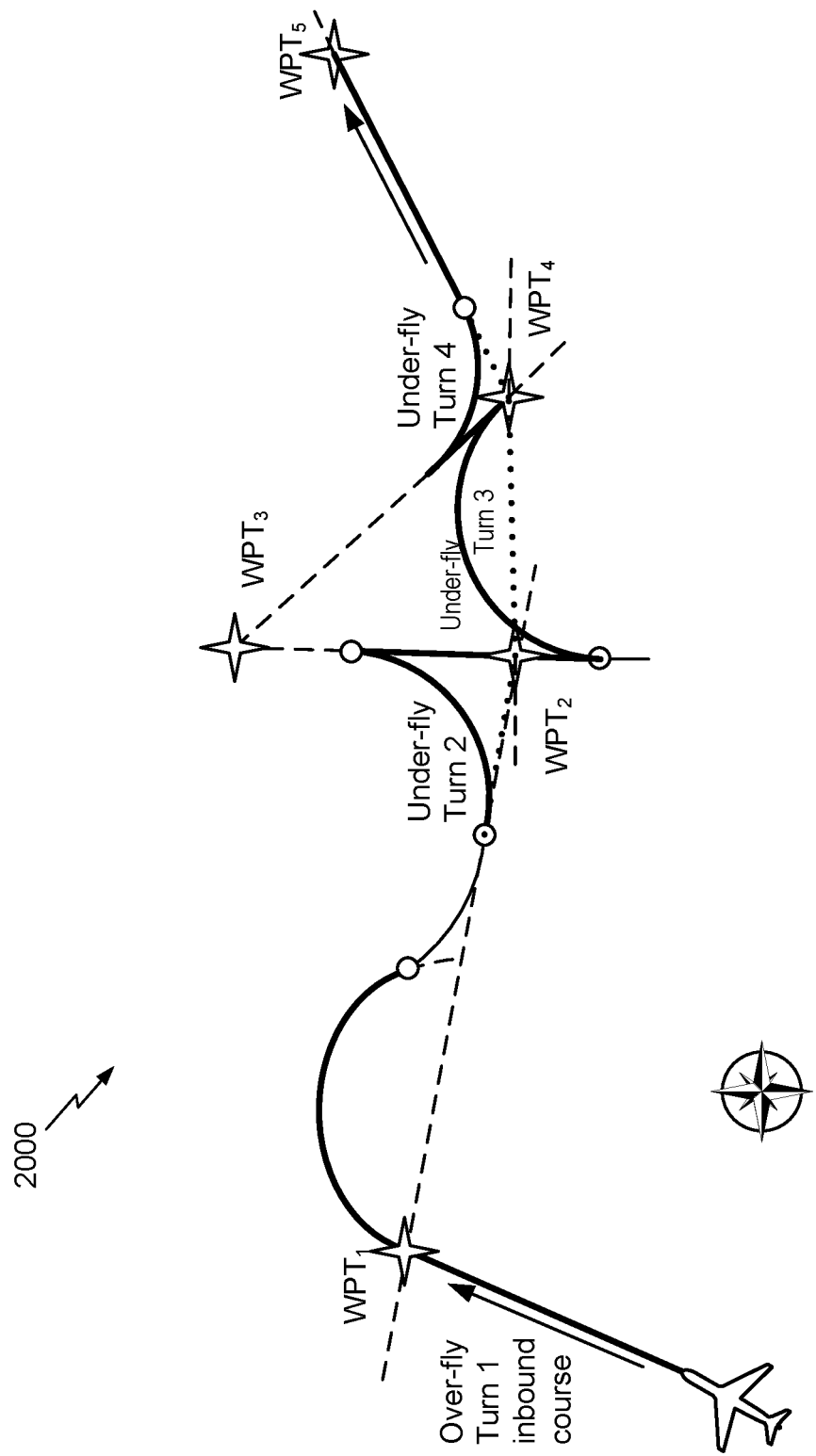
FIG. 20 depicts a diagram of another process for adjusting a trajectory profile.

Referring to FIG. 20, a diagram of a process 2000 for adjusting a trajectory profile is shown. The process 2000 can be performed by the flight management system 202 of FIG. 2. The process 2000 illustrates an example of modifying at least one aspect (e.g., the second segment 262) of the initial trajectory profile 232 by constructing a flight trajectory between a first waypoint of the flight plan 230 and a third waypoint of the flight plan 230. The process 2000 also bypasses construction of a flight trajectory between the first waypoint and a second waypoint of the flight plan 230. The second waypoint is subsequent to the first waypoint, and the third waypoint is subsequent to the second waypoint. Thus, the process 2000 constructs a trajectory that effectively removes (or ignores) a waypoint in the flight plan 230.

According to the process 2000, if an impermissible flight condition is present and the distance to the next waypoint is greater than the distance to the subsequent waypoint, the next waypoint is bypassed (e.g., dropped) from the construction and a course capture (or nominal construction) to the subsequent flight plan leg is attempted.

Figure 21:
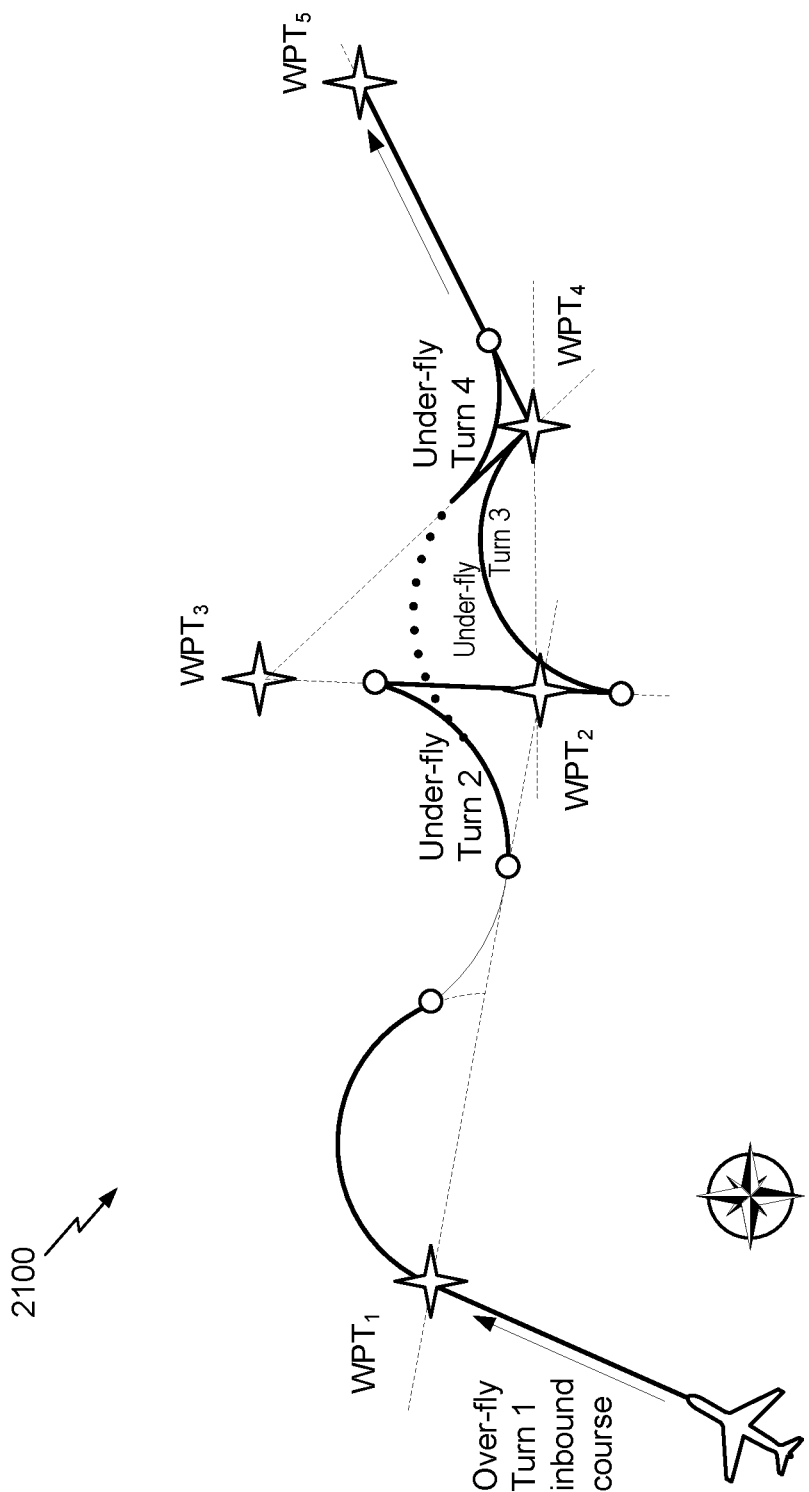
FIG. 21 depicts a diagram of another process for adjusting a trajectory profile.

Referring to FIG. 21, a diagram of a process 2100 for adjusting a trajectory profile is shown. The process 2100 can be performed by the flight management system 202 of FIG. 2. The process 2100 illustrates an example of modifying at least one aspect (e.g., the second segment 262) of the initial trajectory profile 232 by constructing a flight trajectory between a first waypoint of the flight plan 230 and a third waypoint of the flight plan 230. The process 2100 also bypasses construction of a flight trajectory between the first waypoint and a second waypoint of the flight plan 230. The second waypoint is subsequent to the first waypoint, and the third waypoint is subsequent to the second waypoint. Thus, the process 2200 constructs a trajectory that effectively removes (or ignores) a waypoint in the flight plan 230.

According to the process 2100, if there are multiple successive waypoints with an impermissible flight condition and the distance to the next waypoint is greater than the distance to a subsequent waypoint, the intermediate waypoint is dropped and a trajectory to the subsequent waypoint is constructed. The trajectory connects the turn arc from the turn prior to the dropped waypoint to the turn arc of the waypoint after the dropped one.

Figure 22:
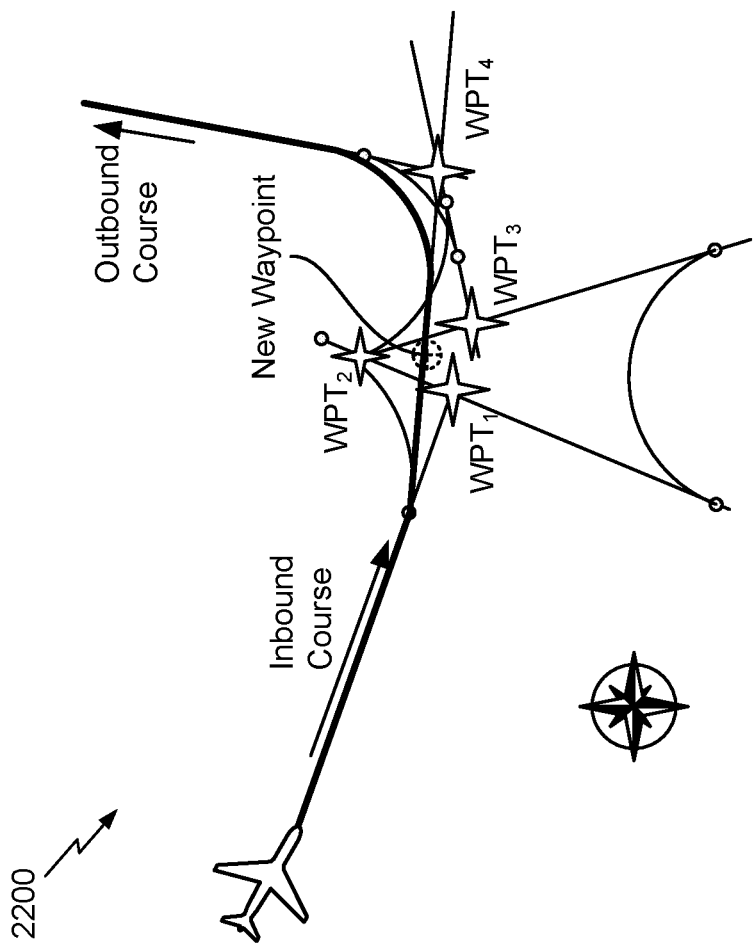
FIG. 22 depicts a diagram of another process for adjusting a trajectory profile.

Referring to FIG. 22, a diagram of a process 2200 for adjusting a trajectory profile is shown. The process 2200 can be performed by the flight management system 202 of FIG. 2. The process 2200 illustrates an example of modifying at least one aspect (e.g., the second segment 262) of the initial trajectory profile 232 by constructing a flight trajectory between a first waypoint of the flight plan 230 and a third waypoint of the flight plan 230. The process 2200 also bypasses construction of a flight trajectory between the first waypoint and a second waypoint of the flight plan 230. The second waypoint is subsequent to the first waypoint, and the third waypoint is subsequent to the second waypoint. Thus, the process 2200 constructs a trajectory that effectively removes (or ignores) a waypoint in the flight plan 230.

According to the process 2200, if waypoints are clustered so close together that each turn construction has an impermissible flight condition, the center of the waypoint cluster for all waypoints within one turn radius of each other is determined. A fly-over transition turn is constructed to that location, and the fly-over transition connects the inbound and outbound course and a course capture to the next waypoint. Thus, a virtual waypoint is added to the modified flight plan.

To determine whether a cluster is present, the distance between each waypoint is identified as being in an impermissible flight condition and previous and subsequent waypoints to the first and last waypoints are determined and compared to the turn radius. Waypoints that are within one turn radius of points (both before and after the cluster) are determined to be within the cluster.

Figure 23:
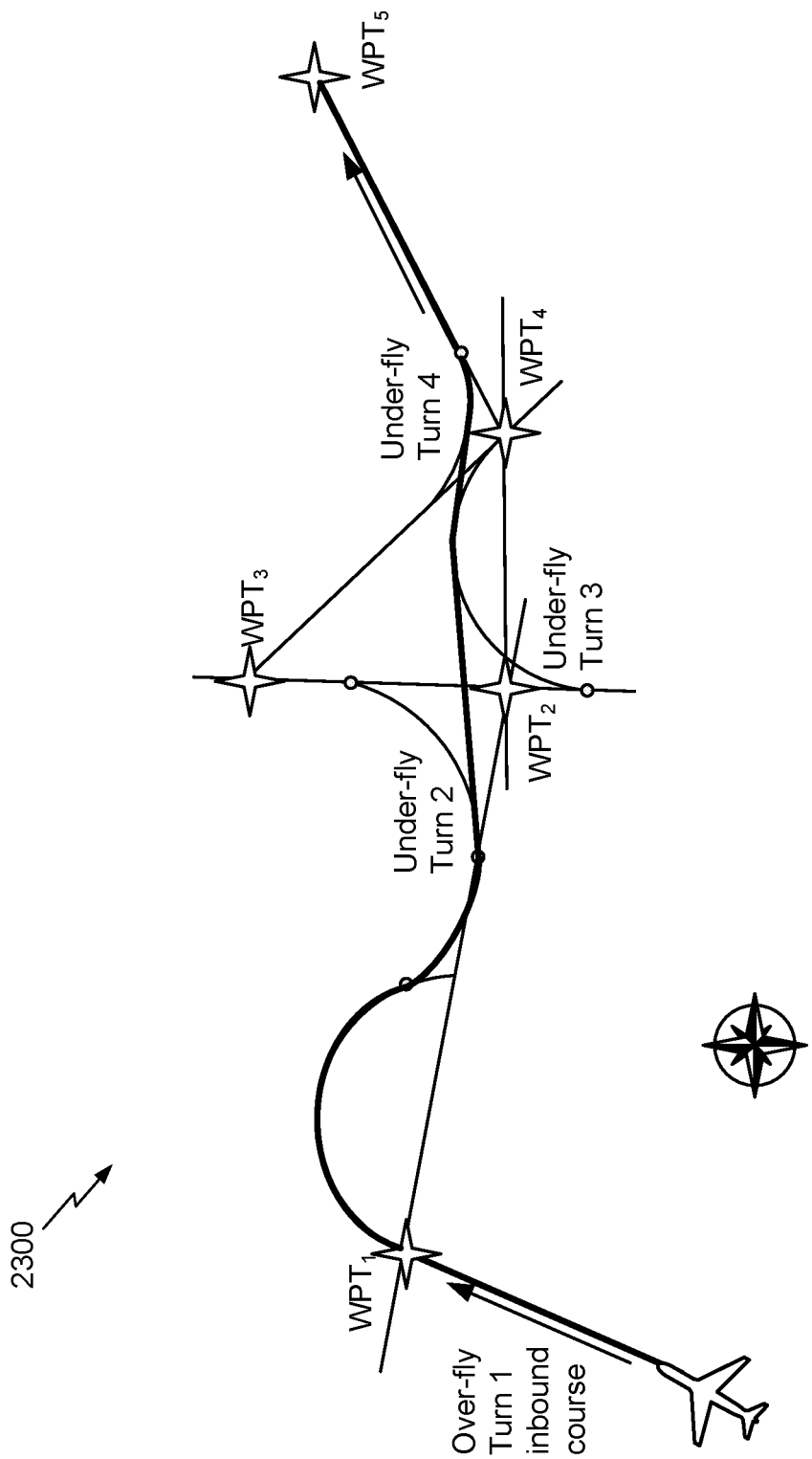
FIG. 23 depicts a diagram of another process for adjusting a trajectory profile.

Referring to FIG. 23, a diagram of a process 2300 for adjusting a flight plan is shown. The process 2300 can be performed by the flight management system 202 of FIG. 2. The process 2300 illustrates an example of modifying at least one aspect (e.g., the second segment 262) of the initial trajectory profile 232 by inserting a straight segment between a first turn included in the second segment 262 of the initial trajectory profile 232 and a second turn included in the second segment 262 of the initial trajectory profile. According to the process 2300, if any of the turn transitions for waypoints in the cluster can be connected with a co-tangent straight segment, the impermissible flight conditions are solved in a similar manner as described with respect to FIGS. 13A-19.

According to one implementation, if the impermissible flight condition indicates that the turn radius due to a speed of aircraft 100 and environmental conditions allows for a bank angle higher than what is called for in the leg transition, the turn radius is increased and the transition is re-calculated. If a nominal turn transition construction uses a limit of half the course change up to twenty-five percent, a rule based decision engine can allow the twenty-five percent of the bank angle if an impermissible flight condition for a shallow angle is encountered.

Figure 24:
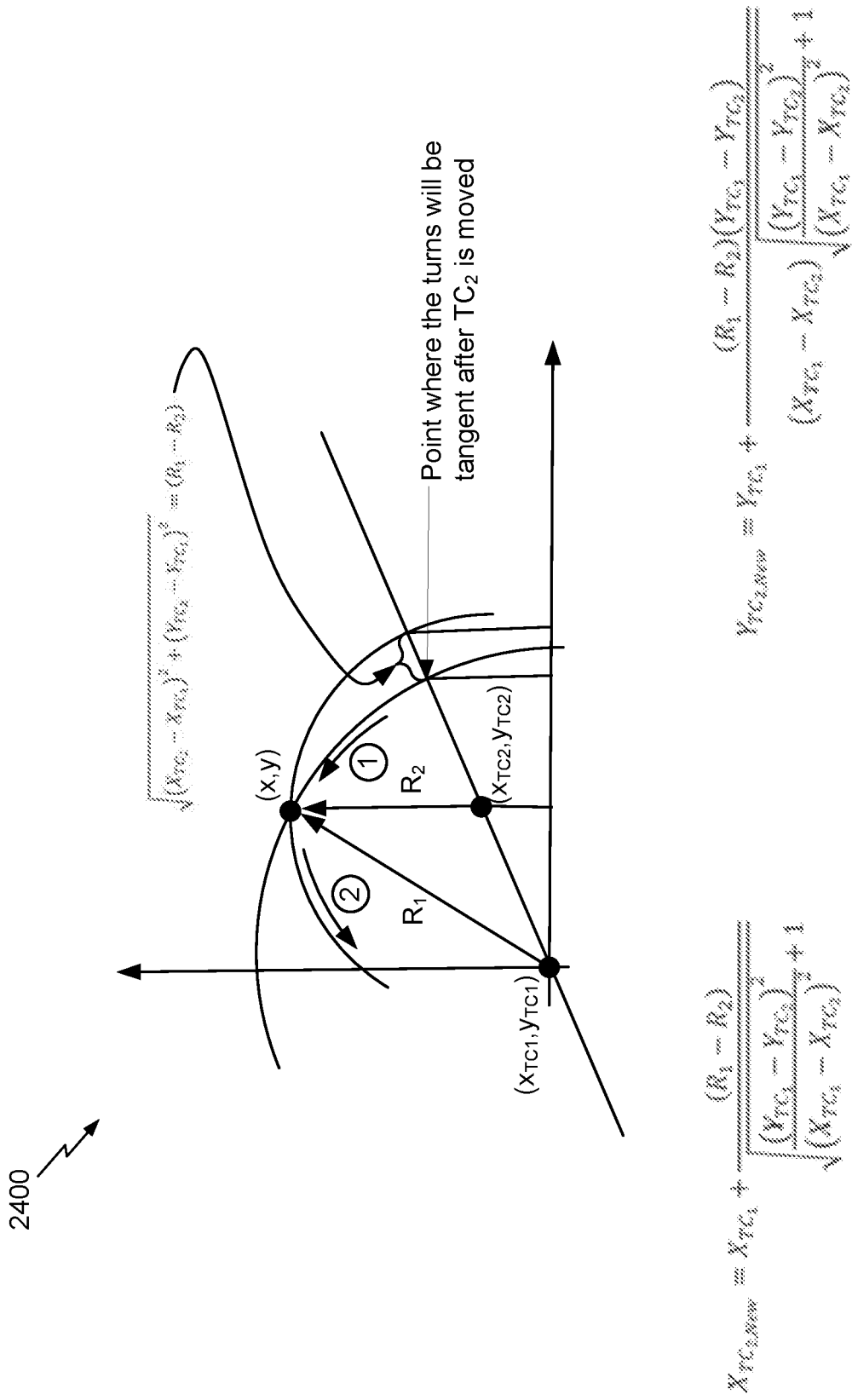
FIG. 24 depicts a diagram of another process for adjusting a trajectory profile.

Referring to FIG. 24, a diagram of a process 2400 for adjusting a trajectory profile is shown. The process 2400 illustrates an example of modifying at least one aspect (e.g., the second segment 262) of the initial trajectory profile 232 by modifying at least one of a location of a center of a first turn included in the second segment 262 of the initial trajectory profile 232, modifying a location of a center of a second turn included in the second segment 262 of the initial trajectory profile 232, or both. The second turn may be immediately subsequent to the first turn in the initial trajectory profile 232.

The process 2400 can be implemented by the flight management system 202 for the scenario where a same-side turn produces a "fish tail" impermissible flight condition. According to the process 2400, the turn center for the second turn is translated towards the turn center for the second turn along a path parallel to a line between the turn centers until the end of the first turn ($FTP_1$) is coincident with the beginning of the second turn ($ITP_2$). FIG. 24 also illustrates a closed-form algorithm (e.g., equations) used by the modification circuit 270 to determine distance to move the turn centers.

Figure 25:
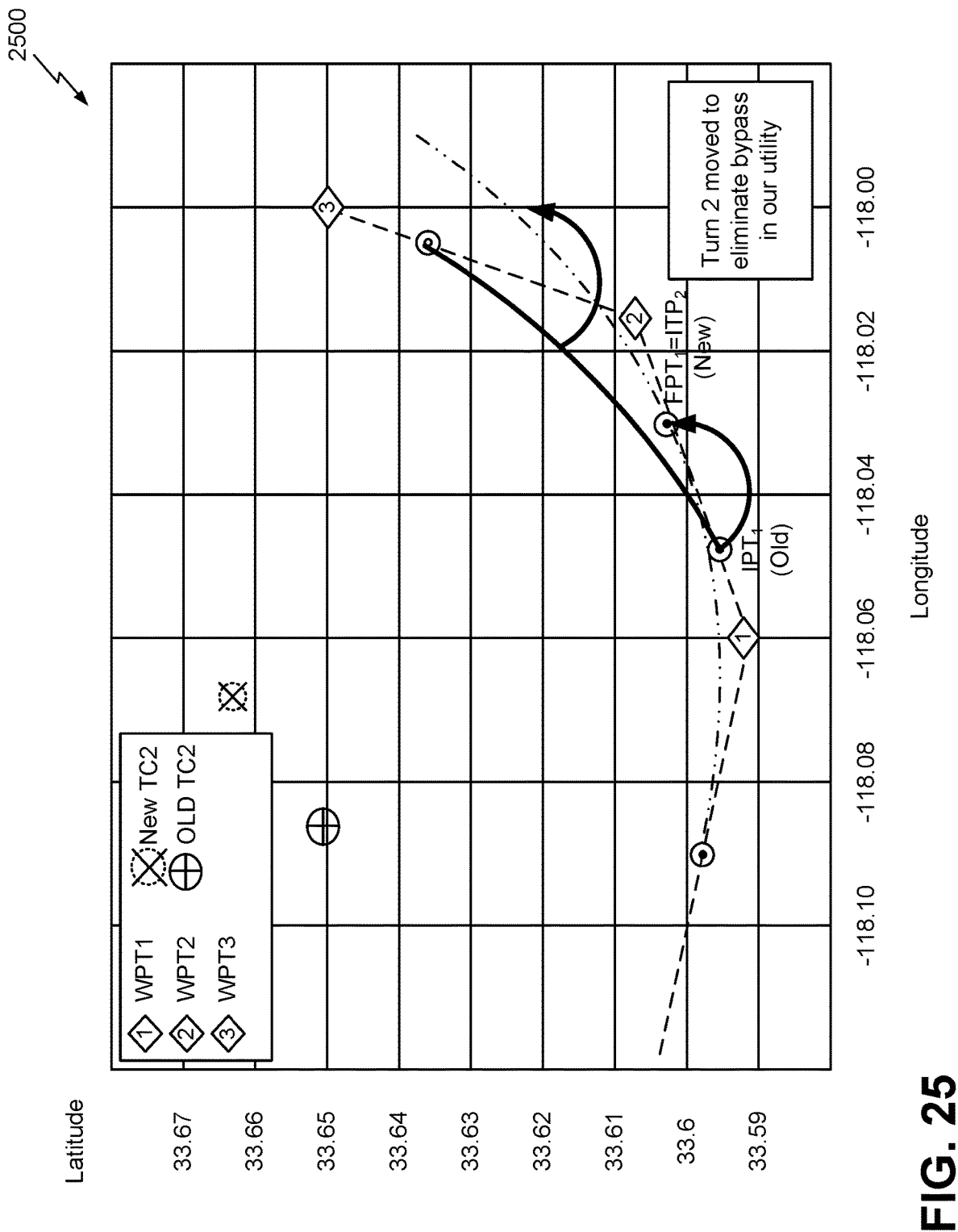
FIG. 25 depicts a diagram of another process for adjusting a trajectory profile.

Referring to FIG. 25, a diagram of a process 2500 for adjusting a flight plan is shown. The process 2500 can be implemented by the flight management system 202 for the scenario where a same-side turn produces a "fish tail" impermissible flight condition. According to the process 2500, the turn center for the second turn is translated on a path parallel to a line between the first waypoint ($WPT_1$) and the second waypoint ($WPT_2$) until a tangent is achieved on the way-line between the first waypoint ($WPT_1$) and the second waypoint ($WPT_2$). The translation is completed with a course-capture on the outbound second waypoint ($WPT_2$) course.

Figure 26A:
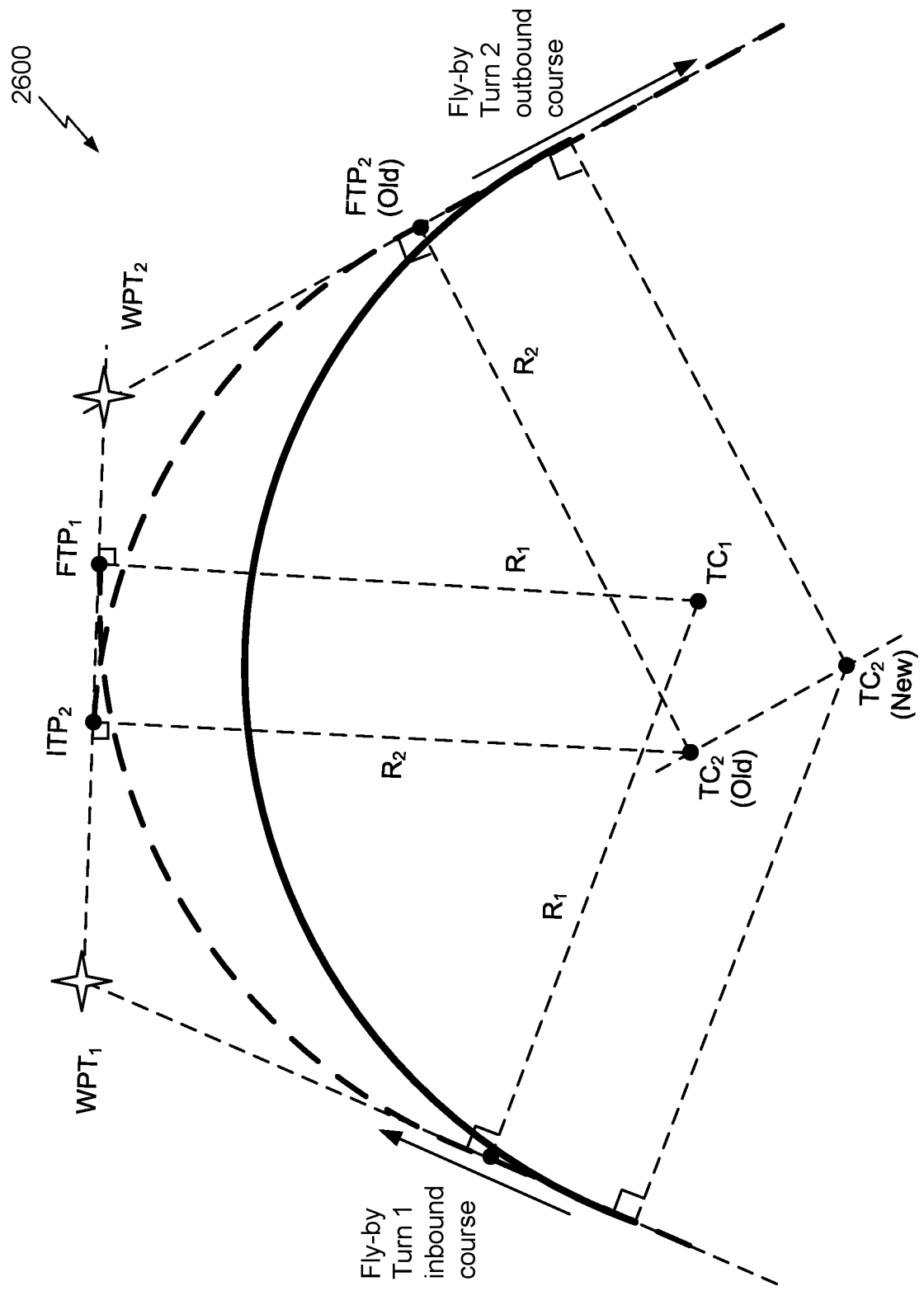
FIG. 26A depicts a diagram of another process for adjusting a trajectory profile.

Referring to FIG. 26A, a diagram of a process 2600 for adjusting a trajectory profile is shown. The process 2600 illustrates an example of modifying at least one aspect (e.g., the second segment 262) of the initial trajectory profile 232 by modifying at least one of a location of a center of a first turn included in the second segment 262 of the initial trajectory profile 232, modifying a location of a center of a second turn included in the second segment 262 of the initial trajectory profile 232, or both. The second turn may be immediately subsequent to the first turn in the initial trajectory profile 232.

The process 2600 can be implemented by the flight management system 202 for the scenario where a same-side turn produces a "fish tail" impermissible flight condition. According to the process 2600, the turn center for the second turn is translated along a path parallel to a line on the second waypoint ($WPT_2$) output course until a tangent is achieved with the arc from the first turn center ($TC_1$). For example, the second turn center ($TC_2$) (Old) may be translated to the second turn center ($TC_2$) (New). Alternatively, the first turn center ($TC_1$) can be translated along a path parallel to its inbound course until tangency is achieved with the second waypoint ($WPT_2$) outbound course. The first turn center ($TC_1$) can be translated using an iterative translation or a closed-form translation.

Figure 26B:
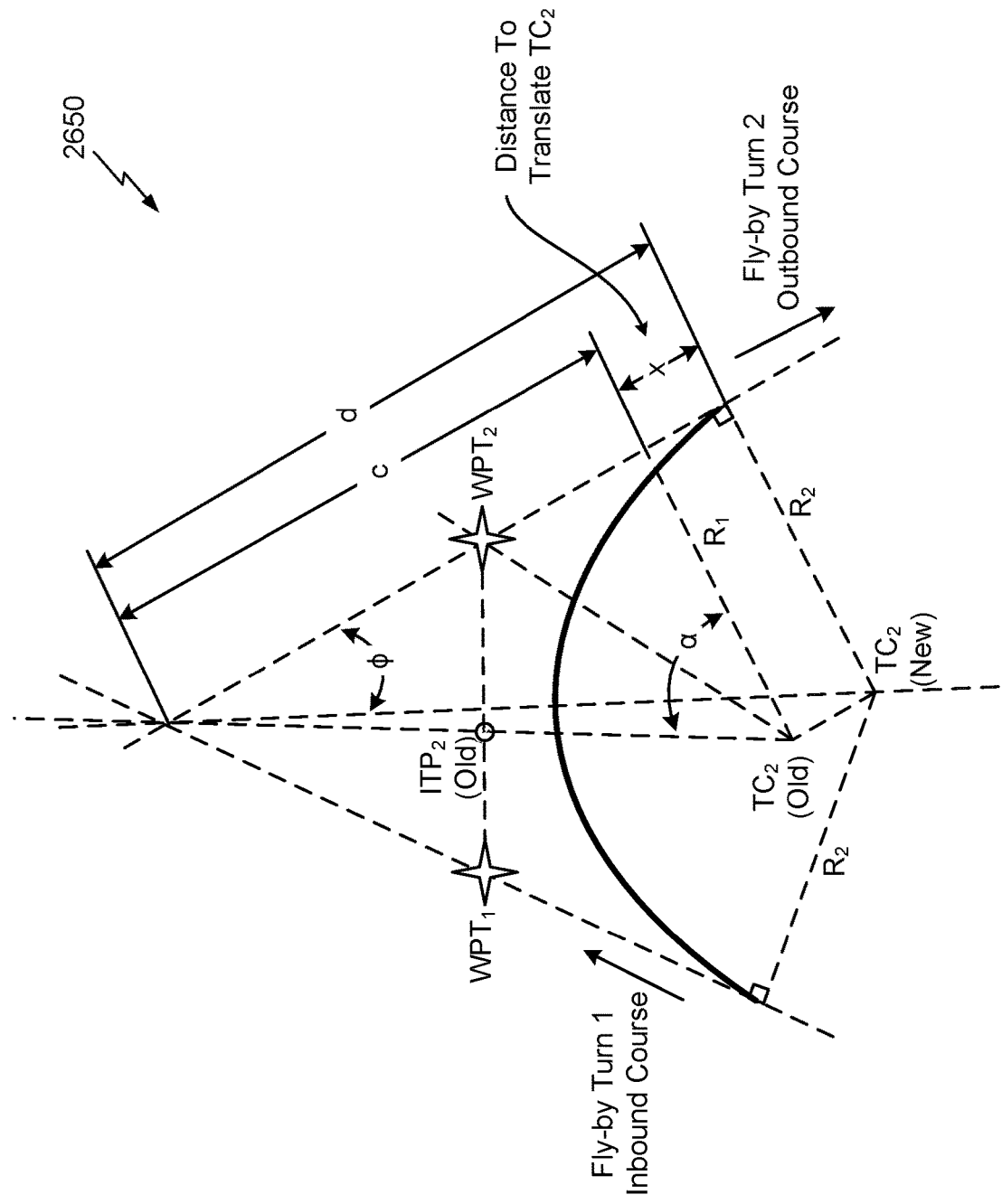
FIG. 26B depicts a diagram of another process for adjusting a trajectory profile.

Referring to FIG. 26B, a diagram of a process 2650 for adjusting a trajectory profile is shown. The process 2650 illustrates an example of modifying at least one aspect (e.g., the second segment 262) of the initial trajectory profile 232 by modifying at least one of a location of a center of a first turn included in the second segment 262 of the initial trajectory profile 232, modifying a location of a center of a second turn included in the second segment 262 of the initial trajectory profile 232, or both. The second turn may be immediately subsequent to the first turn in the initial trajectory profile 232. The process 2650 can be implemented by the flight management system 202 for the scenario where a same-side turn produces a "fish tail" impermissible flight condition. According to the process 2650, the distance (x) to translate the second turn center ($TC_2$) in order to achieve tangency with the inbound and outbound courses is expressed as $x = R_2 (\cot \emptyset - \tan \alpha)$.

Figure 27:
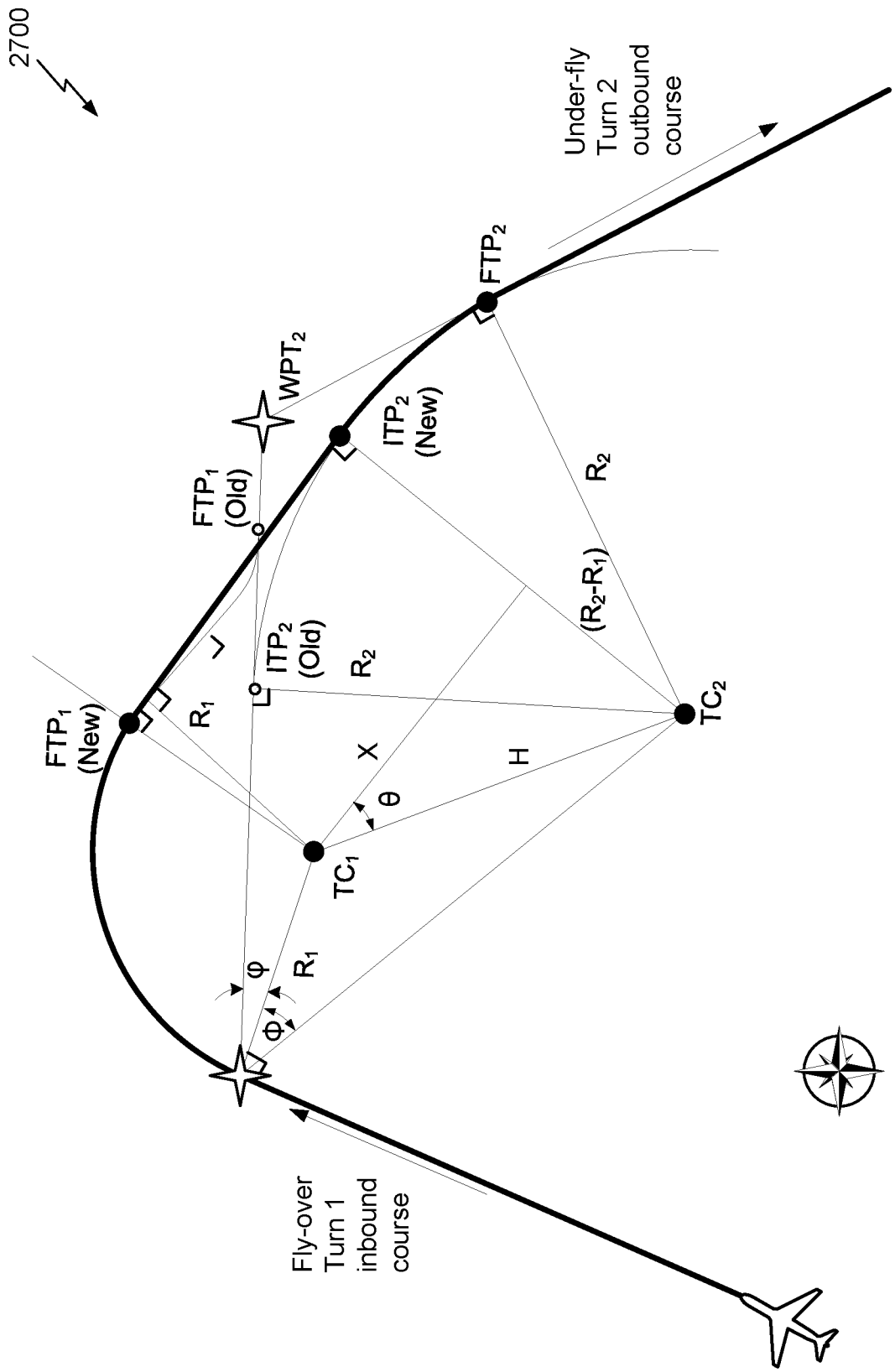
FIG. 27 depicts a diagram of another process for adjusting a trajectory profile.

Referring to FIG. 27, a diagram of a process 2700 for adjusting a trajectory profile is shown. The process 2700 can be implemented by the flight management system 202 for the scenario where a same-side turn produces an impermissible flight condition. According to the process 2700, the construction is for the first waypoint ($WPT_1$) overfly transition that intercepts the first waypoint ($WPT_1$) outbound course closer to the second waypoint ($WPT_2$) than the beginning of the second turn ($ITP_2$). A co-tangent straight segment is added at a point tangent to both arcs.

Figure 28:
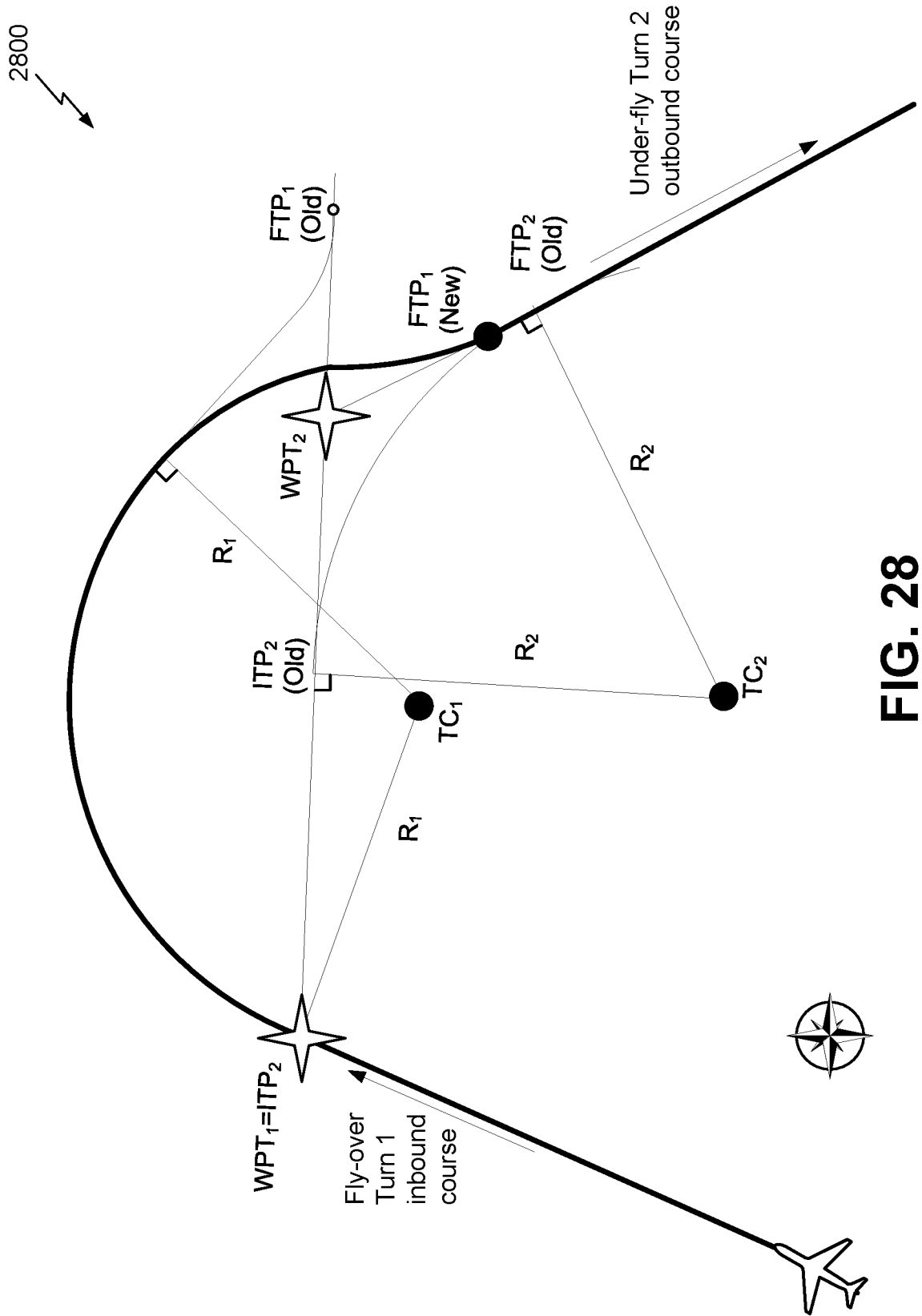
FIG. 28 depicts a diagram of another process for adjusting a trajectory profile.

Referring to FIG. 28, a diagram of a process 2800 for adjusting a trajectory profile is shown. The process 2800 can be implemented by the flight management system 202 for the scenario where a same-side turn produces an impermissible flight condition. The process 2800 illustrates an example of modifying at least one aspect (e.g., the second segment 262) of the initial trajectory profile 232 by modifying a final point of a first turn included in the second segment 262 of the initial trajectory profile 232 and performing a course capture on an outbound course associated with a second turn included in the second segment 262 of the initial trajectory profile 232.

According to the process 2800, in the scenario where the first turn is a fly-over transition that intercepts the first waypoint ($WPT_1$) and the second waypoint ($WPT_2$) course at a position that is past the second waypoint ($WPT_2$), the impermissible flight condition is removed by continuing the first turn until a course capture to intercept the second waypoint ($WPT_2$) outbound course can be constructed. The process 2800 can also be applied to a scenario where the waypoint ($WPT_1$) is an under-fly and the speed of the aircraft 100 is high enough that the trajectory results in course capture past the waypoint ($WPT_2$).

Figure 29:
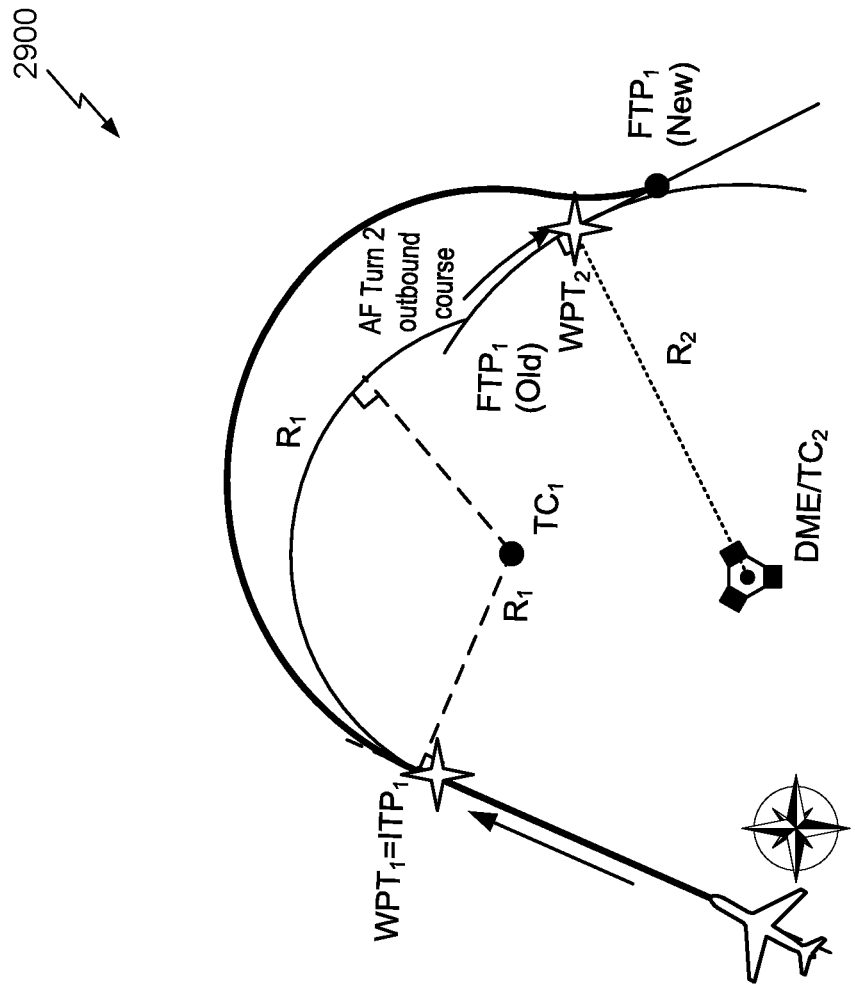
FIG. 29 depicts a diagram of another process for adjusting a trajectory profile.

Referring to FIG. 29, a diagram of a process 2900 for adjusting a trajectory profile is shown. The process 2900 illustrates an example of modifying at least one aspect (e.g., the second segment 262) of the initial trajectory profile 232 by inserting a straight segment between a first turn included in the second segment 262 of the initial trajectory profile 232 and a second turn included in the second segment 262 of the initial trajectory profile. The process 2900 can be implemented by the flight management system 202 for the scenario where a same-side turn produces an impermissible flight condition. According to the process 2900, in the scenario where there is an overfly course capture to an arc leg, if capturing the arc leg is not possible because the first turn radius does not allow a capture before the intended arc exit, a course capture is performed to the second waypoint (WPT$_2$) outbound course.

Figure 30:
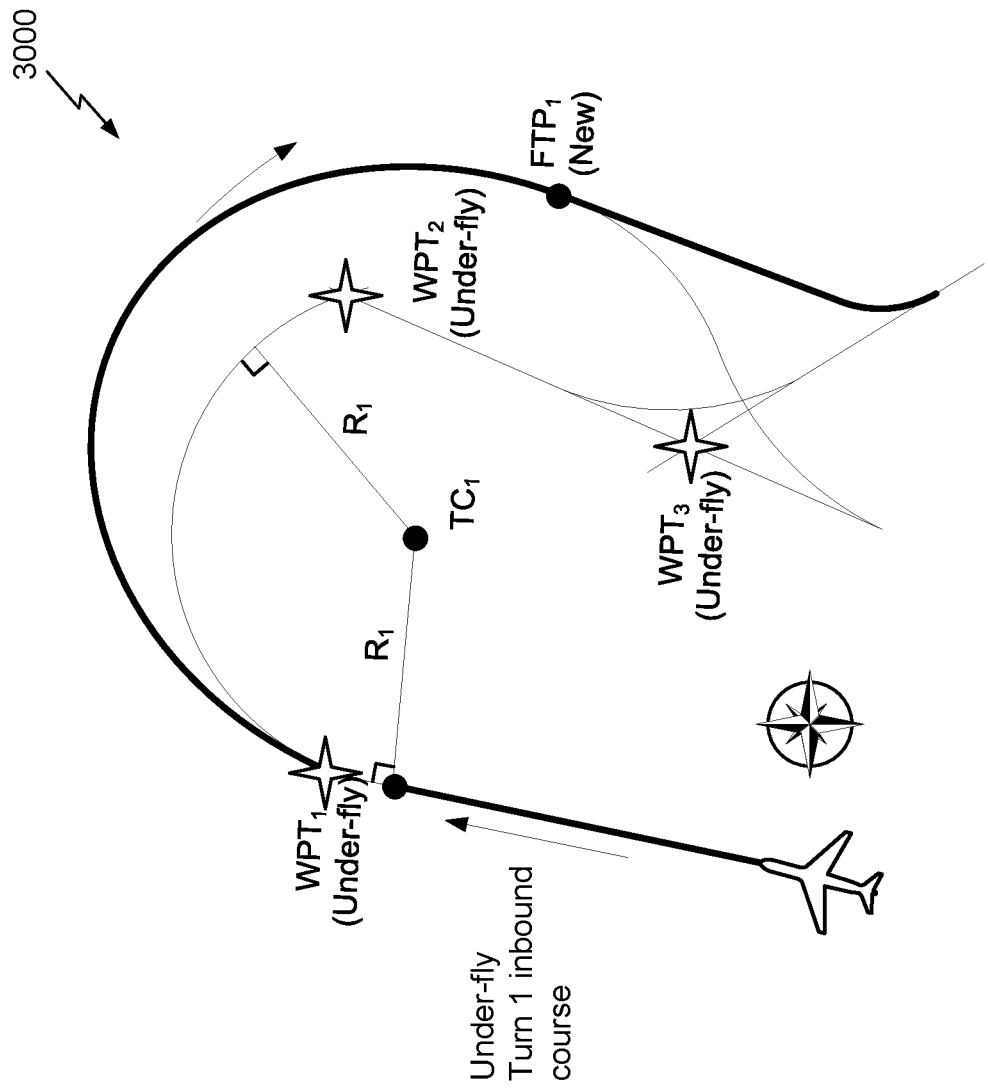
FIG. 30 depicts a diagram of another process for adjusting a trajectory profile.

Referring to FIG. 30, a diagram of a process 3000 for adjusting a trajectory profile is shown. The process 3000 can be implemented by the flight management system 202 for the scenario where a same-side turn produces a "fish tail" impermissible flight condition. The process 3000 illustrates an example of modifying at least one aspect (e.g., the second segment 262) of the initial trajectory profile 232 by modifying a final point of a first turn included in the second segment 262 of the initial trajectory profile 232 and performing a course capture on an outbound course associated with a second turn included in the second segment 262 of the initial trajectory profile 232.

According to the process 3000, in the situation of a fly-by course capture to an arc leg, if the first turn radius does not allow a capture before the intended arc exit, a course capture is performed to the second waypoint (WPT$_2$) outbound course. Otherwise, the relationship between the course intersection and the waypoint determines if that waypoint is dropped and a course capture is constructed to the subsequent outbound course.

Figure 31:
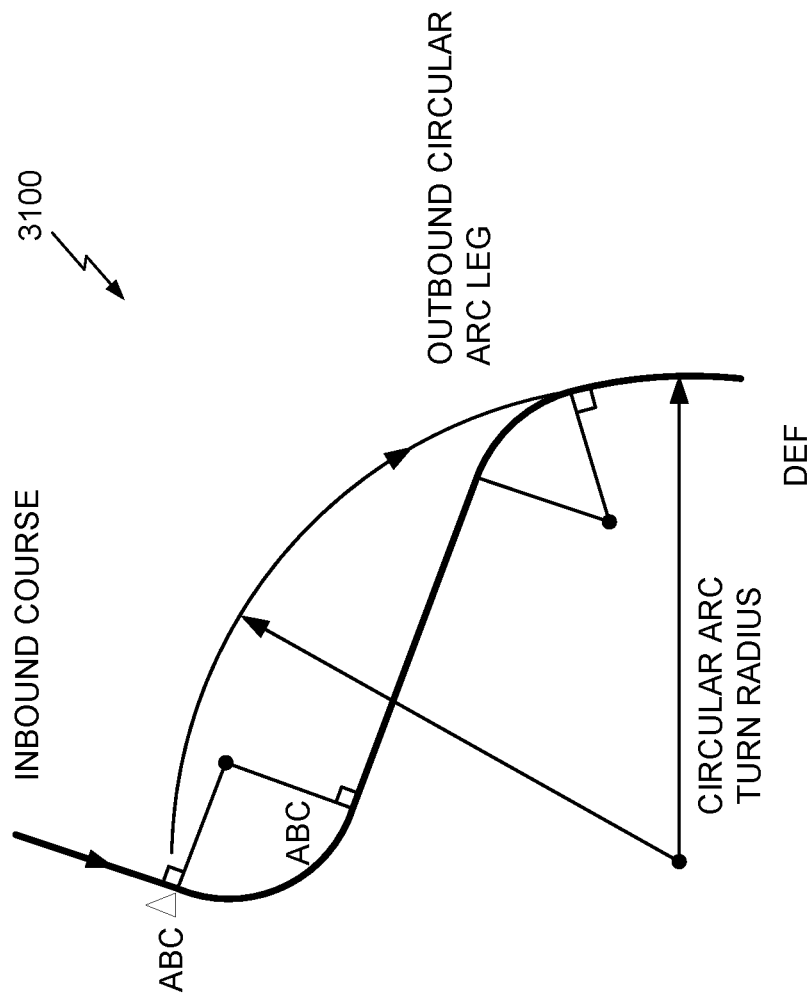
FIG. 31 depicts a diagram of another process for adjusting a trajectory profile.

Referring to FIG. 31, a diagram of a process 3100 for adjusting a trajectory profile is shown. The process 3100 uses a nominal fly-over to circular arc transition to adjust the trajectory profile. The process 3100 for adjusting a trajectory profile can be implemented by the flight management system 202 for the scenario where a same-side turn produces an impermissible flight condition. According to the process 3100, in the scenario in which an overfly to a non-tangent intersection with an arc to a fix leg where the turn radius is too large to capture the arc, the impermissible flight condition is resolved by constructing a course capture to the second waypoint (WPT$_2$) outbound course.

Figure 32:
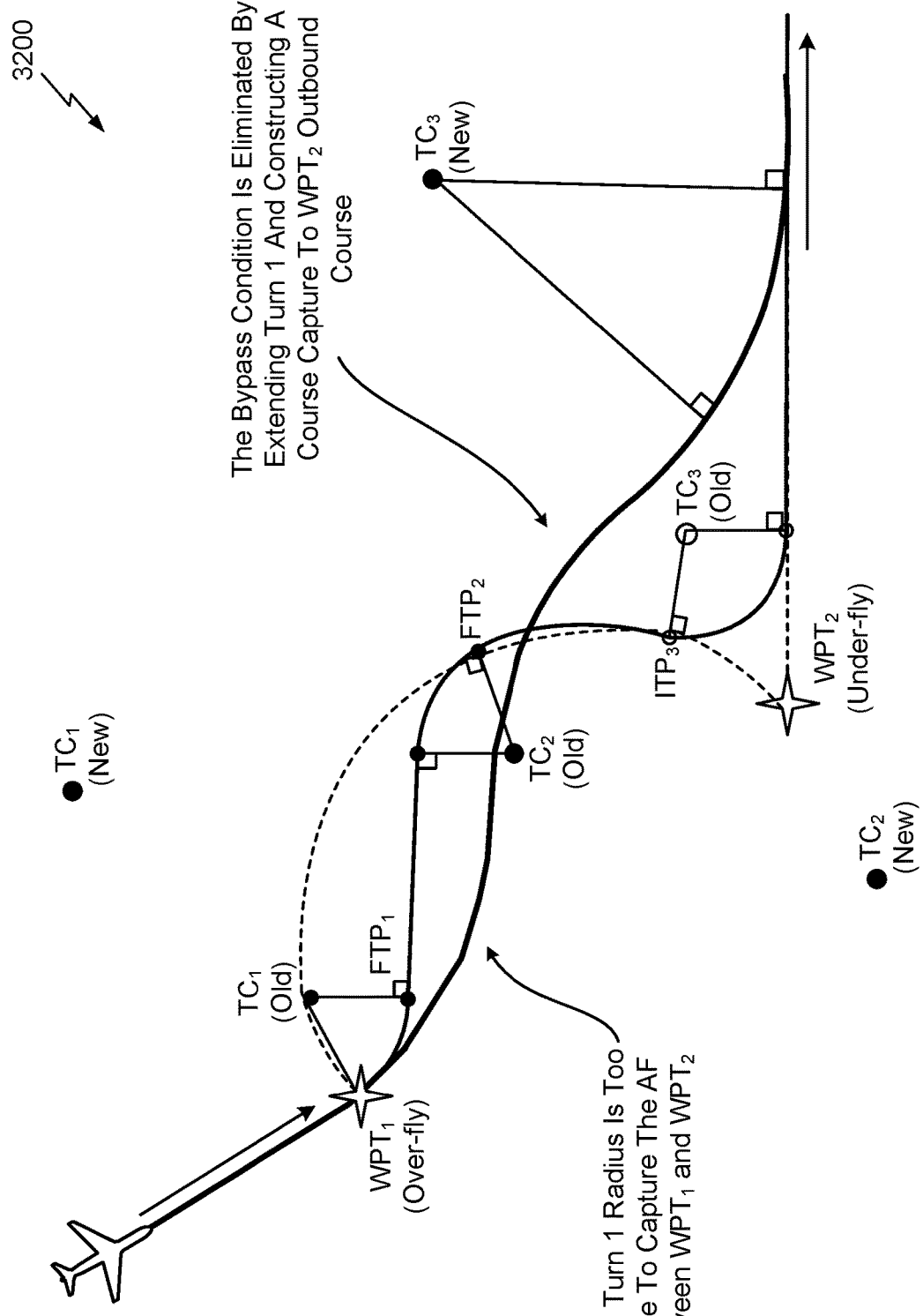
FIG. 32 depicts a diagram of another process for adjusting a trajectory profile.

Referring to FIG. 32, a diagram for of a process 3200 of adjusting a trajectory profile is shown. The process 3200 can be implemented by the flight management system 202. According to the process 3200, the initial turn radius for the first turn is too large to capture the AF leg between the first waypoint (WPT$_1$) and the second waypoint (WPT$_2$). As a result, an impermissible flight condition is created. To resolve the impermissible flight condition, the first turn is extended and a course capture to the second waypoint outbound course is constructed.

Figure 33:
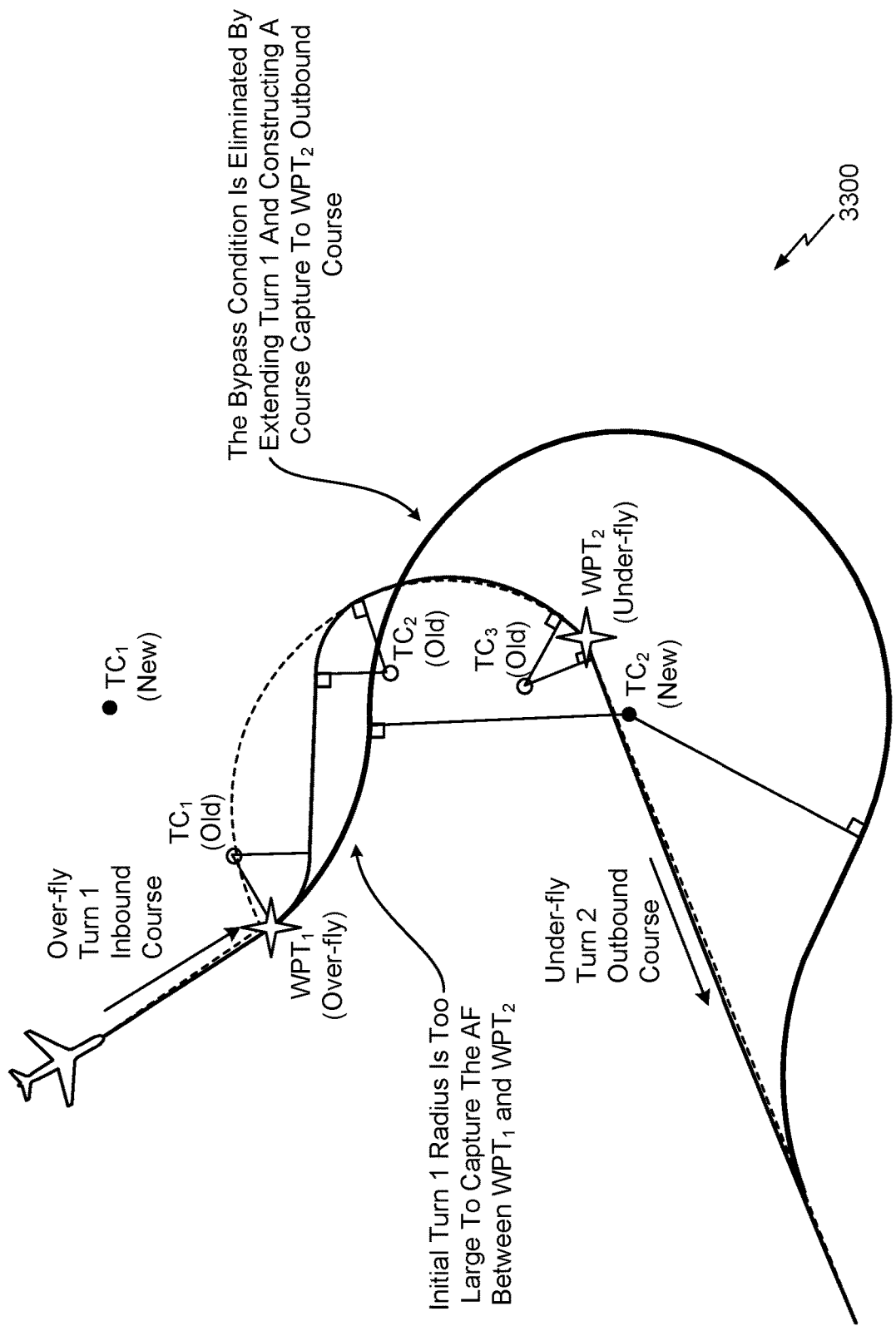
FIG. 33 depicts a diagram of another process for adjusting a trajectory profile.

Referring to FIG. 33, a diagram for of a process 3300 of adjusting a trajectory profile is shown. The process 3300 can be implemented by the flight management system 202. According to the process 3300, the initial turn radius for the first turn is too large to capture the AF leg between the first waypoint (WPT$_1$) and the second waypoint (WPT$^2$). As a result, an impermissible flight condition is created. To resolve the impermissible flight condition, the first turn is extended and a course capture to the second waypoint outbound course is constructed.

Figure 34:
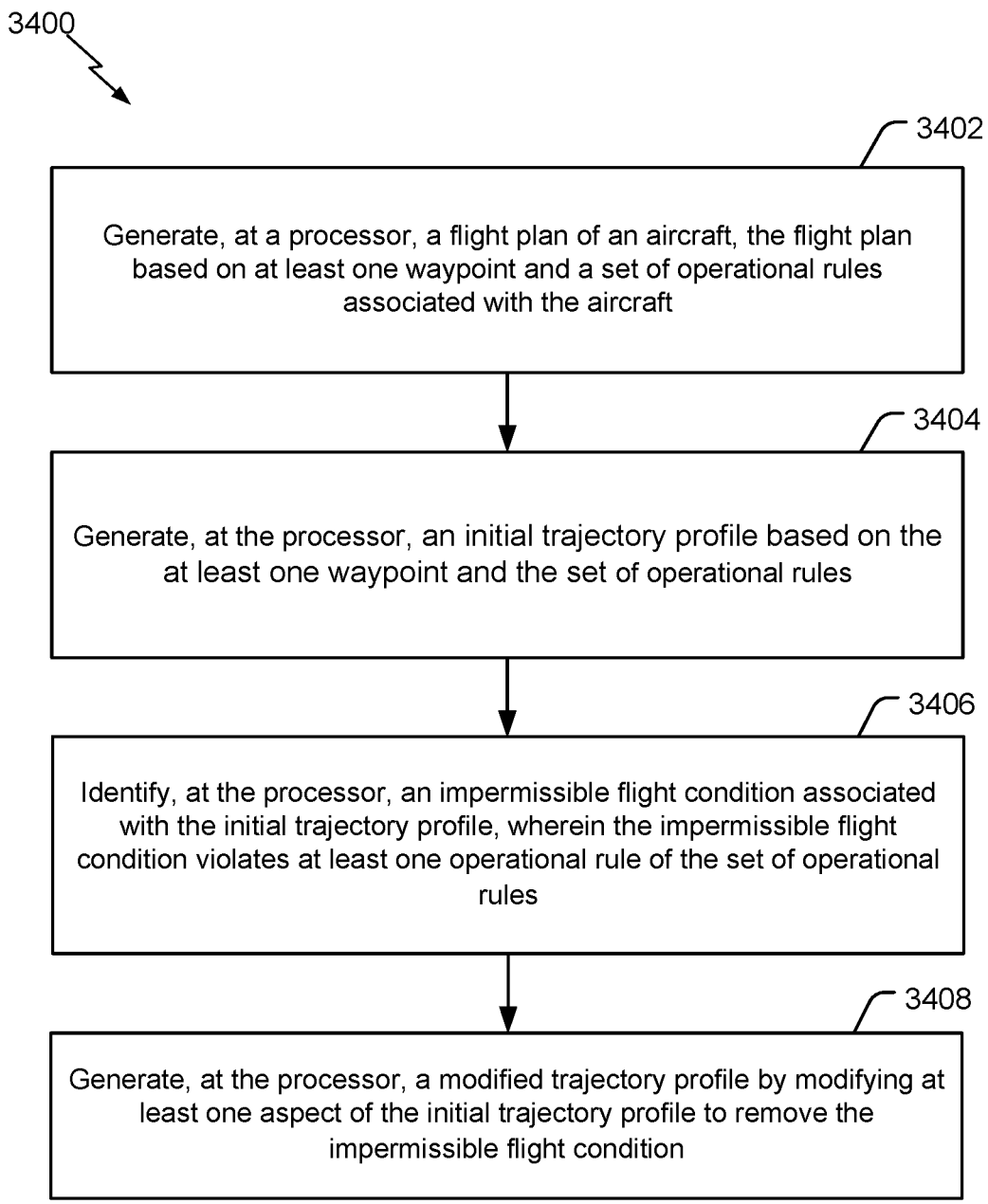
FIG. 34 is a flowchart of a method for modifying a trajectory profile in response to identification of an impermissible flight condition.

Referring to FIG. 34, a flowchart of a method 3400 for modifying a flight trajectory profile in response to identification of an impermissible flight condition. The method 3400 can be performed by the system 200 of FIG. 2. In a particular implementation, the method 3400 can be performed by the flight management system 202.

The method 3400 includes generating, at a processor, a flight plan of an aircraft, at 3402. The flight plan is based on at least one waypoint and a set of operational rules associated with the aircraft. For example, referring to FIG. 2, the flight management system 202 generates the flight plan 230. The flight plan 230 is based on the waypoints 234-238 and the set of operational rules 222.

The method 3400 also includes generating, at the processor, an initial trajectory profile based on the at least one waypoint and the set of operational rules, at 3404. For example, referring to FIG. 2, the flight management system 202 generate the initial trajectory profile 232 based on the at least one waypoint and the set of operational rules 222.

The method 3400 also includes identifying, at the processor, an impermissible flight condition associated with the initial trajectory profile, at 3406. The impermissible flight condition violates at least one operational rule of the set of operational rules. For example, referring to FIG. 2, the flight management system 202 identifies an impermissible flight condition associated with the initial trajectory profile 232. The impermissible flight condition violates at least one of the operational rules 224-228.

According to one implementation, the impermissible flight condition is identified based on a flight time associated with the initial trajectory profile exceeding a particular flight time or a flight distance associated with the initial trajectory profile exceeding a particular flight distance. According to another implementation, the impermissible flight condition is identified based on a turn radius of a particular turn within the initial trajectory profile being greater than a threshold radius associated with capturing a hold.

The method 3400 also includes generating, at the processor, a modified trajectory profile by modifying at least one aspect of the initial trajectory profile to remove the impermissible flight condition, at 3408. For example, referring to FIG. 2, the modification circuit 270 generates the modified trajectory profile 242 by modifying the initial trajectory profile 232 to remove the impermissible flight condition. The method 3400 also includes initiating display of the modified trajectory profile, at 3408. For example, referring to FIG. 2, the flight management system 202 displays the modified trajectory profile 242 on the display screen 210. Identifying the impermissible flight condition and modifying the at least one aspect of the initial trajectory profile may include performing at least one flight plan correction (e.g., one of the techniques described with respect to FIGS. 1-33) with a path capture transition.

According to one implementation, modifying the at least one aspect of the initial trajectory profile includes translating a turn center for a second turn within the initial trajectory profile until an end of a first turn within the initial trajectory profile is coincident with a beginning of the second turn. According to another implementation, modifying the at least one aspect of the initial trajectory profile includes translating a turn center for a second turn within the initial trajectory profile along a path parallel to a line between a first waypoint of the flight plan and a second waypoint of the flight plan. According to another implementation, modifying the at least one aspect of the initial trajectory profile includes translating a turn center for a second turn within the initial trajectory profile along a path parallel to a line outbound from a second waypoint of the flight plan. According to another implementation, modifying the at least one aspect of the initial trajectory profile includes adding a co-tangent straight segment at one or more points tangent to a first turn arc and a second turn arc based on a first waypoint overfly transition intercepting a first waypoint outbound course closer to a second waypoint than to a beginning of a second turn.

According to one implementation, the method 3400 includes determining whether at least three bypass waypoints are included in adjacent legs of the flight plan. The method 3400 may also include in response to a determination that at least three bypass waypoints are included in the adjacent legs, determining whether more than two bypass waypoints of the at least three bypass waypoints are located within a particular turn radius. The method 3400 may also include grouping the more than two bypass waypoints based on a centroid of the more than two bypass waypoints.

The method 3400 of FIG. 34 thus enables dynamic modification to the initial trajectory profile 232 in response to impermissible flight conditions. As a non-limiting example, the initial trajectory profile 232 can indicate that the first turn has a turn radius of 5 kilometers to pass through the waypoint 234. However, due to impermissible flight conditions (e.g., an airspeed of 880 kilometers per hour), completion of the first turn at the turn radius can result in an error condition. For example, completing the first turn at the airspeed of 880 kilometers per hour violates the operational rule 226. Thus, to ensure a better flight experience for passengers, the flight management system 202 modifies the initial trajectory profile 232 to comply with the operational rule 226.

Figure 35:
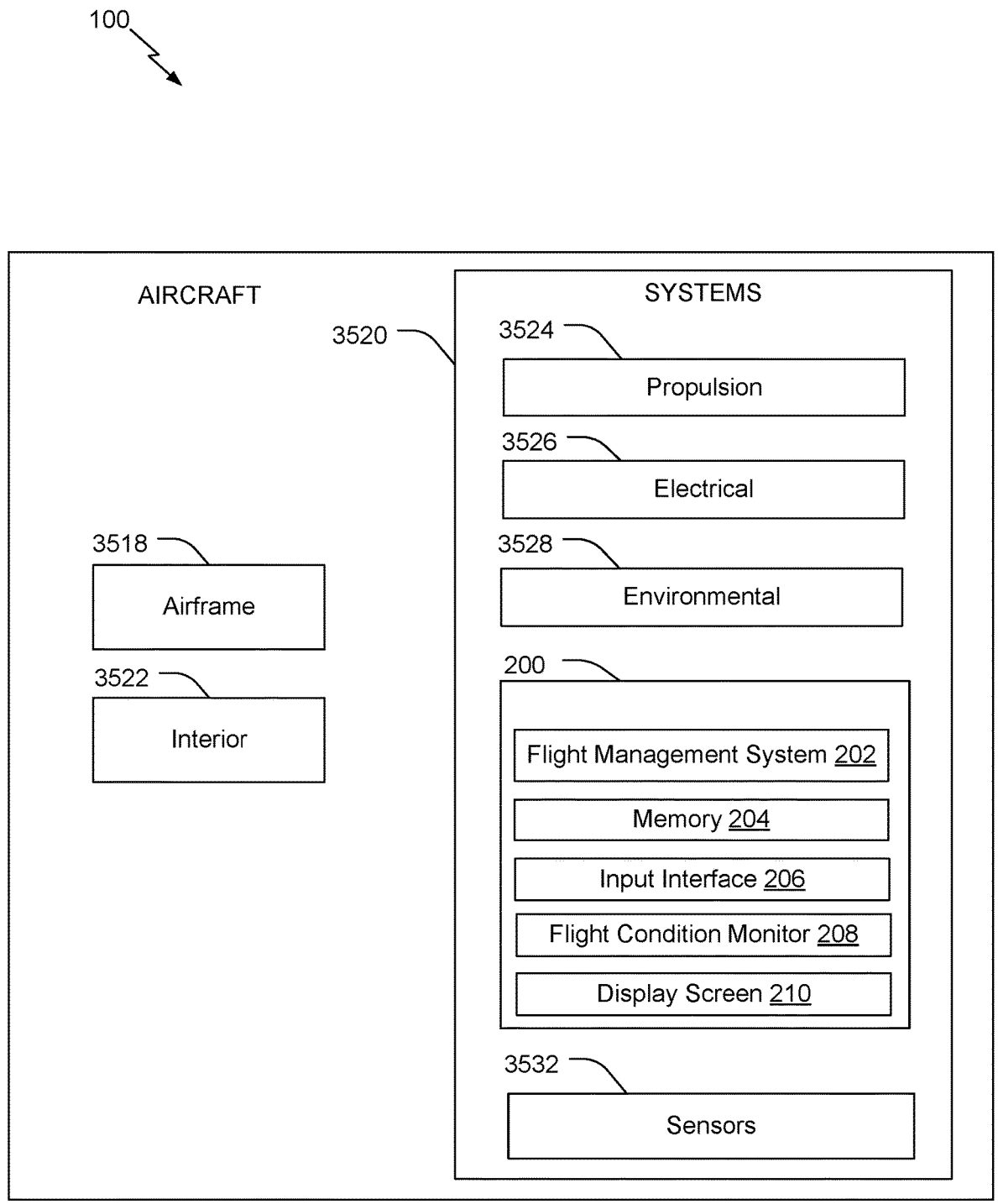
FIG. 35 is a block diagram of the aircraft of FIG. 1.

FIG. 35 is a block diagram of an illustrative implementation of the aircraft 100 that includes components of the system 200. As shown in FIG. 35, the aircraft 100 includes an airframe 3518, a plurality of systems 3520, and an interior 3522. Examples of the plurality of systems 3520 include one or more of a propulsion system 3524, an electrical system 3526, an environmental system 3528, the system 200, and a sensor system 3532. The sensor system 3532 includes one or more sensors onboard the aircraft 100 and configured to generate sensor data during operation of the aircraft 100. The system 200 includes the flight management system 202, the memory 204, the input interface 206, the flight condition monitor 208, and the display screen 210.

The illustrations of the examples described herein are intended to provide a general understanding of the structure of the various implementations. The illustrations are not intended to serve as a complete description of all of the elements and features of apparatus and systems that utilize the structures or methods described herein. Many other implementations can be apparent to those of skill in the art upon reviewing the disclosure. Other implementations can be utilized and derived from the disclosure, such that structural and logical substitutions and changes can be made without departing from the scope of the disclosure. For example, method operations can be performed in a different order than shown in the figures or one or more method operations can be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results can be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features can be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter can be directed to less than all of the features of any of the disclosed examples. Accordingly, the scope of the disclosure is defined by the following claims and their equivalents.

What is claimed is:

1. A method comprising:
   generating, at a processor, a flight plan of an aircraft, the flight plan based on at least one waypoint and a set of operational rules associated with the aircraft;
   generating, at the processor, an initial trajectory profile based on at least one waypoint and the set of operational rules;
   identifying, at the processor, an impermissible flight condition associated with the initial trajectory profile, wherein the impermissible flight condition violates at least one operational rule of the set of operational rules; and
   generating, at the processor using a closed formed calculation based on one or more of a turn center location indicated by the initial trajectory profile, a turn inbound course indicated by the initial trajectory profile, a turn outbound course indicated by the initial trajectory profile, a turn starting location indicated by the initial trajectory profile, a turn ending location indicated by the initial trajectory profile or a turn radius indicated by the initial trajectory profile, a modified trajectory profile by modifying at least one aspect of the initial trajectory profile to remove the impermissible flight condition.

2. The method of claim 1, further comprising updating at least one other system with the modified trajectory profile.

3. The method of claim 2, wherein the at least one other system comprises an autopilot system.

4. The method of claim 1, further comprising initiating display of the modified trajectory profile.

5. The method of claim 1, wherein modifying at least one aspect of the initial trajectory profile comprises modifying at least one of:
   a location of a center of a first turn included in the initial trajectory profile; or
   a location of a center of a second turn included in the initial trajectory profile, the second turn immediately subsequent to the first turn in the initial trajectory profile.

6. The method of claim 5, wherein the location of the center of the first turn is moved along an axis that is parallel to an inbound course of the first turn, and wherein the location of the center of the second turn is moved along an axis that is parallel to an outbound course of the second turn.

7. The method of claim 1, wherein modifying the at least one aspect of the initial trajectory profile comprises inserting a straight segment between a first turn of the initial trajectory profile and a second turn of the initial trajectory profile.

8. The method of claim 7, wherein modifying the at least one aspect of the initial trajectory profile further comprises rotating the straight segment.

9. The method of claim 1, further comprising performing a course capture routine to modify the at least one aspect of the initial trajectory profile.

10. The method of claim 1, wherein modifying the at least one aspect of the initial trajectory profile comprises projecting a line segment from an outbound course by a course capture intercept angle.

11. The method of claim 1, wherein modifying the at least one aspect of the initial trajectory profile comprises:

constructing a flight trajectory between a first waypoint of the flight plan and a third waypoint of the flight plan; and bypassing construction of a flight trajectory between the first waypoint and a second waypoint of the flight plan, wherein the second waypoint is subsequent to the first waypoint, and wherein the third waypoint is subsequent to the second waypoint.

12. The method of claim 1, wherein modifying the at least one aspect of the initial trajectory profile includes modifying a final point of a first turn included in the initial trajectory profile and performing a course capture on an outbound course associated with a second turn included in the initial trajectory profile.

13. The method of claim 1, wherein modifying the at least one aspect of the initial trajectory profile includes modifying an initial point of a first turn included in the initial trajectory profile.

14. The method of claim 1, wherein the impermissible flight condition is identified based on a first distance between a first waypoint and a final point of a first turn included in the initial trajectory profile and a second distance between a second waypoint and the first waypoint.

15. The method of claim 1, wherein the impermissible flight condition is identified based on a first distance between a final point of a first turn included in the initial trajectory profile and a first waypoint and a second distance between an initial point of a second turn included in the initial trajectory profile and the first waypoint.

16. The method of claim 1, wherein the impermissible flight condition is identified based on a comparison of a bank angle included in the initial trajectory profile and a bank angle determined based on an airspeed of the aircraft.

17. The method of claim 1, wherein the impermissible flight condition is identified based on an incomplete turn within the initial trajectory profile.

18. The method of claim 1, wherein the impermissible flight condition is identified based on an angle of a first turn of the initial trajectory profile.

19. The method of claim 1, further comprising:
determining whether at least three bypass waypoints are included in adjacent legs of the flight plan;
in response to a determination that at least three bypass waypoints are included in the adjacent legs, determining whether more than two bypass waypoints of the at least three bypass waypoints are located within a particular turn radius; and
grouping the more than two bypass waypoints based on a centroid of the more than two bypass waypoints.

20. The method of claim 1, wherein the impermissible flight condition is identified based on:
a flight time associated with the initial trajectory profile exceeding a particular flight time; or
a flight distance associated with the initial trajectory profile exceeding a particular flight distance.

21. The method of claim 1, wherein the impermissible flight condition is identified based on a turn radius of a particular turn within the initial trajectory profile being greater than a threshold radius associated with capturing a hold.

22. The method of claim 1, wherein modifying the at least one aspect of the initial trajectory profile comprises translating a turn center for a second turn within the initial trajectory profile until an end of a first turn within the initial trajectory profile is coincident with a beginning of the second turn.

23. The method of claim 1, wherein modifying the at least one aspect of the initial trajectory profile comprises translating a turn center for a second turn within the initial trajectory profile along a path parallel to a line between a first waypoint of the flight plan and a second waypoint of the flight plan.

24. The method of claim 1, wherein modifying the at least one aspect of the initial trajectory profile comprises translating a turn center for a second turn within the initial trajectory profile along a path parallel to a line outbound from a second waypoint of the flight plan.

25. The method of claim 1, wherein modifying the at least one aspect of the initial trajectory profile comprises adding a co-tangent straight segment at one or more points tangent to a first turn arc and a second turn arc based on a first waypoint overfly transition intercepting a first waypoint outbound course closer to a second waypoint than to a beginning of a second turn.

26. An aircraft comprising:
a memory storing a set of operational rules associated with the aircraft; and
a flight management system coupled to the memory and configured to:
generate a flight plan based on at least one waypoint and the set of operational rules;
generate an initial trajectory profile based on at least one waypoint and the set of operational rules;
identify an impermissible flight condition associated with the initial trajectory profile, wherein the impermissible flight condition violates at least one operational rule of the set of operational rules; and
use a closed formed calculation based on one or more of a turn center location indicated by the initial trajectory profile, a turn inbound course indicated by the initial trajectory profile, a turn outboard course indicated by the initial trajectory profile, a turn starting location indicated by the initial trajectory profile, a turn ending location indicated by the initial trajectory profile or a turn radius indicated by the initial trajectory profile to generate a modified trajectory profile by modifying at least one aspect of the initial trajectory profile to remove the impermissible flight condition.

27. The aircraft of claim 26, wherein the set of operational rules includes rules specified by a manufacturer of the aircraft, rules specified by a government agency, user-entered rules, or a combination thereof.

28. The aircraft of claim 26, further comprising a display screen configured to display the modified trajectory profile.

29. A non-transitory computer-readable medium storing instructions that, when executed by a processor on-board an aircraft, cause the processor to perform operations comprising:
generating a flight plan of the aircraft, the flight plan based on at least one waypoint and a set of operational rules associated with the aircraft;
generating an initial trajectory profile based on at least one waypoint and the set of operational rules;
identifying an impermissible flight condition associated with the initial trajectory profile, wherein the impermissible flight condition violates at least one operational rule of the set of operational rules; and
generating, using a closed formed calculation based on one or more of a turn center location indicated by the initial trajectory profile, a turn inbound course indicated by the initial trajectory profile, a turn outboard course indicated by the initial trajectory profile, a turn starting location indicated by the initial trajectory profile, a turn ending location indicated by the initial trajectory profile or a turn radius indicated by the initial trajectory profile, a modified trajectory profile by modifying at least one aspect of the initial trajectory profile to remove the impermissible flight condition.

30. The non-transitory computer-readable medium of claim 29, wherein the operations further comprise updating at least one other system with the modified trajectory profile.

31. The non-transitory computer-readable medium of claim 30, wherein the at least one other system comprises an autopilot system.

32. A method comprising:
generating, at a processor, a flight plan of an aircraft, the flight plan based on at least one waypoint and a set of operational rules associated with the aircraft;
generating, at the processor, an initial trajectory profile based on at least one waypoint and the set of operational rules;
identifying, at the processor, an impermissible flight condition associated with the initial trajectory profile, wherein the impermissible flight condition violates at least one operational rule of the set of operational rules; and
generating, at the processor using a closed formed calculation based on one or more of a turn center location indicated by the initial trajectory profile, a turn inbound course indicated by the initial trajectory profile, a turn outboard course indicated by the initial trajectory profile, a turn starting location indicated by the initial trajectory profile, a turn ending location indicated by the initial trajectory profile or a turn radius indicated by the initial trajectory profile, a modified trajectory profile by modifying at least one aspect of the initial trajectory profile to remove the impermissible flight condition,
wherein identifying the impermissible flight condition and modifying the at least one aspect of the initial trajectory profile comprises performing at least one flight plan correction with a path capture transition.

* * * * *